US009866635B2

(12) United States Patent
Maturana et al.

(10) Patent No.: US 9,866,635 B2
(45) Date of Patent: Jan. 9, 2018

(54) UNIFIED DATA INGESTION ADAPTER FOR MIGRATION OF INDUSTRIAL DATA TO A CLOUD PLATFORM

(71) Applicant: Rockwell Automation Technologies, Inc., Mayfield Heights, OH (US)

(72) Inventors: Francisco P. Maturana, Lyndhurst, OH (US); Juan L. Asenjo, Timberlake, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 373 days.

(21) Appl. No.: 14/619,933

(22) Filed: Feb. 11, 2015

(65) Prior Publication Data

US 2015/0281356 A1 Oct. 1, 2015

Related U.S. Application Data

(60) Provisional application No. 61/970,798, filed on Mar. 26, 2014.

(51) Int. Cl.
*G06F 15/16* (2006.01)
*H04L 29/08* (2006.01)
(Continued)

(52) U.S. Cl.
CPC ........ *H04L 67/1097* (2013.01); *G06F 9/5072* (2013.01); *G06F 9/541* (2013.01)

(58) Field of Classification Search
CPC ..... H04L 67/1097; G06F 9/5072; G06F 9/541
(Continued)

(56) References Cited

U.S. PATENT DOCUMENTS 5,519,605 A 5/1996 Cawlfield
6,230,010 B1 5/2001 Morris
(Continued)

FOREIGN PATENT DOCUMENTS

CN 1755564 4/2006
CN 1937559 3/2007
(Continued)

OTHER PUBLICATIONS

Extended European Search Report for EP Application Serial No. 15160989.8, dated Sep. 22, 2016, 5 pages.
(Continued)

*Primary Examiner* — Tauqir Hussain
(74) *Attorney, Agent, or Firm* — Amin, Turocy & Watson, LLP

(57) ABSTRACT

A cloud gateway device facilitates collection of industrial data from one or more data sources on the plant floor and migration of the collected data to a cloud platform for storage and processing. The cloud gateway device collects historical, live, and/or alarm data directly from industrial devices networked to the gateway device, formats and encapsulates the data with customer-specific header information, and sends the resulting data packets to a cloud platform for processing by cloud-level analytics services. To keep local memory requirements low, the cloud gateway device supports store-and-forward functionality in the event of a communication loss to the cloud platform, whereby the collected industrial data is redirected to an external data storage repository until communication to the cloud platform is reestablished.

20 Claims, 21 Drawing Sheets

(51) Int. Cl.
   *G06F 9/50* (2006.01)
   *G06F 9/54* (2006.01)

(58) Field of Classification Search
   USPC .................................................. 709/217
   See application file for complete search history.

(56) References Cited

U.S. PATENT DOCUMENTS

| | | |
|---|---|---|
| 6,609,034 B1 | 8/2003 | Behrens et al. |
| 6,640,241 B1 | 10/2003 | Ozzie et al. |
| 6,675,226 B1 | 1/2004 | Nair et al. |
| 7,133,908 B1 | 11/2006 | Pajak et al. |
| 7,159,209 B1 | 1/2007 | Srinivasan et al. |
| RE39,989 E | 1/2008 | Morris |
| 7,676,287 B2 | 3/2010 | Eryurek et al. |
| 8,219,216 B2 | 7/2012 | Klug et al. |
| 8,275,847 B2 | 9/2012 | Lewis |
| 2003/0014387 A1 | 1/2003 | Kreidler et al. |
| 2003/0083754 A1 | 5/2003 | Tripathi et al. |
| 2003/0212818 A1* | 11/2003 | Klein ............... H04L 51/12 709/238 |
| 2004/0141517 A1 | 7/2004 | Balasubramanian et al. |
| 2004/0230859 A1* | 11/2004 | Cochran ............ G06F 11/2058 714/2 |
| 2005/0010333 A1 | 1/2005 | Lorton et al. |
| 2005/0154477 A1 | 7/2005 | Martin et al. |
| 2005/0193285 A1 | 9/2005 | Jeon |
| 2006/0068762 A1 | 3/2006 | Baldwin et al. |
| 2006/0294047 A1* | 12/2006 | Johnston ............ G05B 19/0426 |
| 2007/0019641 A1 | 1/2007 | Pai et al. |
| 2008/0168092 A1 | 7/2008 | Boggs et al. |
| 2008/0317058 A1 | 12/2008 | Williams |
| 2009/0089227 A1 | 4/2009 | Sturrock et al. |
| 2009/0183201 A1 | 7/2009 | Dasgupta |
| 2009/0198350 A1 | 8/2009 | Thiele |
| 2009/0265036 A1 | 10/2009 | Jamieson et al. |
| 2009/0326892 A1 | 12/2009 | Lin |
| 2010/0070852 A1 | 3/2010 | Li |
| 2010/0256794 A1* | 10/2010 | McLaughlin ...... G05B 19/4183 700/110 |
| 2010/0256795 A1* | 10/2010 | McLaughlin ...... G05B 19/4183 700/110 |
| 2010/0257228 A1 | 10/2010 | Staggs et al. |
| 2011/0066298 A1 | 3/2011 | Francino |
| 2011/0103393 A1 | 5/2011 | Meier et al. |
| 2011/0134930 A1* | 6/2011 | McLaren ............ H04L 1/1614 370/401 |
| 2011/0145836 A1 | 6/2011 | Wheeler et al. |
| 2012/0143378 A1* | 6/2012 | Spears ................. H04L 12/282 700/275 |
| 2012/0166963 A1 | 6/2012 | Kohli et al. |
| 2012/0232869 A1 | 9/2012 | Maturana et al. |
| 2012/0331104 A1 | 12/2012 | Akiyama et al. |
| 2013/0067090 A1 | 3/2013 | Batrouni et al. |
| 2013/0081146 A1 | 3/2013 | Hakozaki |
| 2013/0110298 A1 | 5/2013 | Beveridge |
| 2013/0123965 A1 | 5/2013 | Cooper et al. |
| 2013/0124253 A1 | 5/2013 | Cooper et al. |
| 2013/0150986 A1 | 6/2013 | Timsjo et al. |
| 2013/0191106 A1 | 7/2013 | Kephart et al. |
| 2013/0211559 A1 | 8/2013 | Lawson et al. |
| 2013/0211870 A1 | 8/2013 | Lawson et al. |
| 2013/0212420 A1 | 8/2013 | Lawson et al. |
| 2013/0225151 A1 | 8/2013 | King et al. |
| 2013/0227446 A1 | 8/2013 | Zala et al. |
| 2013/0262678 A1 | 10/2013 | Tung et al. |
| 2013/0266193 A1 | 10/2013 | Tiwari et al. |
| 2013/0269020 A1 | 10/2013 | Griffin et al. |
| 2013/0283151 A1 | 10/2013 | Deguzman et al. |
| 2013/0290952 A1 | 10/2013 | Childers, Jr. |
| 2014/0047107 A1 | 2/2014 | Maturana et al. |
| 2014/0147064 A1 | 2/2014 | Maturana et al. |
| 2014/0115592 A1 | 4/2014 | Frean et al. |
| 2014/0156234 A1 | 6/2014 | Maturana et al. |
| 2014/0164124 A1 | 6/2014 | Rhoads |
| 2014/0207868 A1 | 7/2014 | Gordon et al. |
| 2014/0257528 A1 | 9/2014 | Perez et al. |
| 2014/0269531 A1 | 9/2014 | Luna et al. |
| 2014/0274005 A1 | 9/2014 | Luna et al. |
| 2014/0280796 A1 | 9/2014 | Pijewski |
| 2014/0282015 A1 | 9/2014 | Nixon et al. |
| 2014/0337473 A1 | 11/2014 | Frusina et al. |
| 2015/0220080 A1 | 8/2015 | Nixon et al. |

FOREIGN PATENT DOCUMENTS

| | | | |
|---|---|---|---|
| CN | 103293953 | 9/2013 | |
| CN | 203466840 | 3/2014 | |
| CN | 103701953 | 4/2014 | |
| EP | 1422619 | 5/2004 | |
| EP | 2228965 | 9/2010 | |
| EP | 2228965 A1 * | 9/2010 | ......... H04L 12/2836 |
| EP | 2541354 | 1/2013 | |
| EP | 2592812 | 5/2013 | |
| EP | 2660667 | 11/2013 | |
| EP | 2704401 | 3/2014 | |

OTHER PUBLICATIONS

Extended European Search Report for EP Application Serial No. 15160988.0, dated Sep. 16, 2016, 9 pages.
European Office Action for EP Application Serial No. 15160941.9, dated Aug. 29, 2016, 2 pages.
European Office Action for EP Application Serial No. 15160980.7, dated Sep. 5, 2016, 2 pages.
Office Action for U.S. Appl. No. 14/525,131, dated Oct. 4, 2016, 56 pages.
Office Action for U.S. Appl. No. 14/634,174, dated Nov. 4, 2016, 25 pages.
European Office Action for EP Application Serial No. 15160988.0, dated Oct. 24, 2016, 2 pages.
Office Action for U.S. Appl. No. 14/562,233, dated Jan. 25, 2017, 25 pages.
Office Action for U.S. Appl. No. 14/639,279, dated Feb. 10, 2017, 110 pages.
Office Action for U.S. Appl. No. 14/525,131, dated Feb. 3, 2017, 21 pages.
Office Action for U.S. Appl. No. 14/525,144, dated Feb. 3, 2017, 42 pages.
Office Action for U.S. Appl. No. 14/525,149, dated Feb. 27, 2017, 76 pages.
Office Action for U.S. Appl. No. 14/634,174, dated Feb. 3, 2017, 12 pages.
Extended European Search Report for EP Application Serial No. 15160984.9, dated Jul. 4, 2016, 10 pages.
European Office Action for EP Application Serial No. 15160984.9, dated Aug. 8, 2016, 2 pages.
Extended European Search Report for EP Application Serial No. 15160944.3, dated Jul. 8, 2016, 9 pages.
European Office Action for EP Application Serial No. 15160944.3, dated Aug. 16, 2016, 2 pages.
Extended European Search Report for EP Application Serial No. 15160868.4, dated Jun. 29, 2016, 11 pages.
European Office Action for EP Application Serial No. 15160868.4, dated Aug. 1, 2016, 2 pages.
Extended European Search Report for EP Application Serial No. 15160980.7, dated Jul. 28, 2016, 10 pages.
Extended European Search Report for EP Application Serial No. 15160924.5, dated Jul. 14, 2016, 10 pages.
European Office Action for EP Application Serial No. 15160924.5, dated Aug. 22, 2016, 2016, 2 pages.
Extended European Search Report for EP Application Serial No. 15160941.9, dated Jul. 27, 2016, 12 pages.
Extended European Search Report for EP Application Serial No. 15160987.2, dated Jul. 11, 2016, 9 pages.
European Office Action for EP Application Serial No. 15160987.2, dated Aug. 16, 2016, 2 pages.

(56) References Cited

OTHER PUBLICATIONS

Office Action for U.S. Appl. No. 14/525,131, dated Jun. 28, 2016, 36 pages.
Office Action for U.S. Appl. No. 14/665,128, dated Jul. 20, 2016, 9 pages.
Office Action for U.S. Appl. No. 14/634,174, dated Aug. 4, 2016, 11 pages.
Steiner, J. G., et al., "Kerberos: An Authentication Service for Open Network Systems," Proceedings of the Winter Usenix Conference, Feb. 9, 1988, pp. 191-202.
Office Action from U.S. Appl. No. 14/525,144, dated Sep. 9, 2016, 28 pages.
Office Action for Chinese Application No. 201510136419.4, dated Apr. 21, 2017, 10 pages.
Office Action for Chinese Application No. 201510135130.0, dated May 3, 2017, 15 pages.
Office Action for U.S. Appl. No. 14/478,974, dated Jun. 15, 2017, 11 pages.
Office Action for Chinese Application No. 201510138371.0 dated May 4, 2017, 15 pages.
Final Office Action for U.S. Appl. No. 14/525,149, dated Jul. 7, 2017, 77 pages.
Final Office Action for U.S. Appl. No. 14/639,279, dated Aug. 9, 2017, 66 pages.
Final Office Action for U.S. Appl. No. 14/562,233, dated Jul. 28, 2017, 33 pages.
Chinese Office Action and English Translation thereof dated on Jul. 12, 2017, for Chinese Application No. 201510138210.1, 14 pages.
Office Action for U.S. Appl. No. 14/525,149 dated Oct. 5, 2017, 88 pages.
Office Action for U.S. Appl. No. 15/431,128 dated Oct. 18, 2017, 37 pages.

\* cited by examiner

UNIFIED DATA INGESTION ADAPTER FOR MIGRATION OF INDUSTRIAL DATA TO A CLOUD PLATFORM

CROSS-REFERENCE TO RELATED APPLICATIONS

This application claims priority to U.S. Provisional Application Ser. No. 61/970,798, filed on Mar. 26, 2014, entitled "INDUSTRIAL CLOUD INFRASTRUCTURE FOR DATA INGESTION, MODELING, PROCESSING, ANALYTICS, AND REPORTING," the entirety of which is incorporated herein by reference.

BACKGROUND

The subject matter disclosed herein relates generally to industrial data collection, and, more particularly, to an on-premise cloud gateway device that facilitates collection and upload of industrial data to a cloud-based storage and processing infrastructure.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a cloud gateway device is provided an application interface component configured to receive industrial data from a data source device of an industrial enterprise; a formatting component configured to convert the industrial data to a common format to yield formatted data; a transmission adapter component configured to encapsulate the formatted data with header information to yield a data packet and to send the data packet to a cloud platform over a communication channel; and a redirect component configured to, in response to a determination that the communication channel has become unavailable, send the formatted data to an external data repository.

Also, one or more embodiments provide a method for processing industrial data for migration to a cloud platform, comprising collecting, by a cloud gateway device comprising at least one processor, industrial data from an industrial device associated with an industrial enterprise; converting, by the cloud gateway device, the industrial data to conform to a defined data format to yield formatted data; adding, by the cloud gateway device, header information to the formatted data to yield a data packet; sending, by the cloud gateway device, the data packet to a cloud platform over a first communication link; in response to determining that the first communication link has been interrupted: establishing, by the cloud gateway device, a second communication link to an external data repository device; and redirecting, by the cloud gateway device, the formatted data to the external repository over the second communication link.

Also, according to one or more embodiments, a non-transitory computer-readable medium is provided having stored thereon instructions that, in response to execution, cause a cloud gateway device to perform operations, the operations, comprising receiving industrial data from one or more industrial devices comprising an industrial process; formatting the industrial data to accord to a common data format to yield formatted data; encapsulating the formatted data with header information to yield a data packet; sending the data packet to a cloud platform over a first communication channel; in response to determining that the first communication channel has faulted: instantiating a second communication channel to an external data storage device; and sending the formatted data to the external data storage device over the second communication channel.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
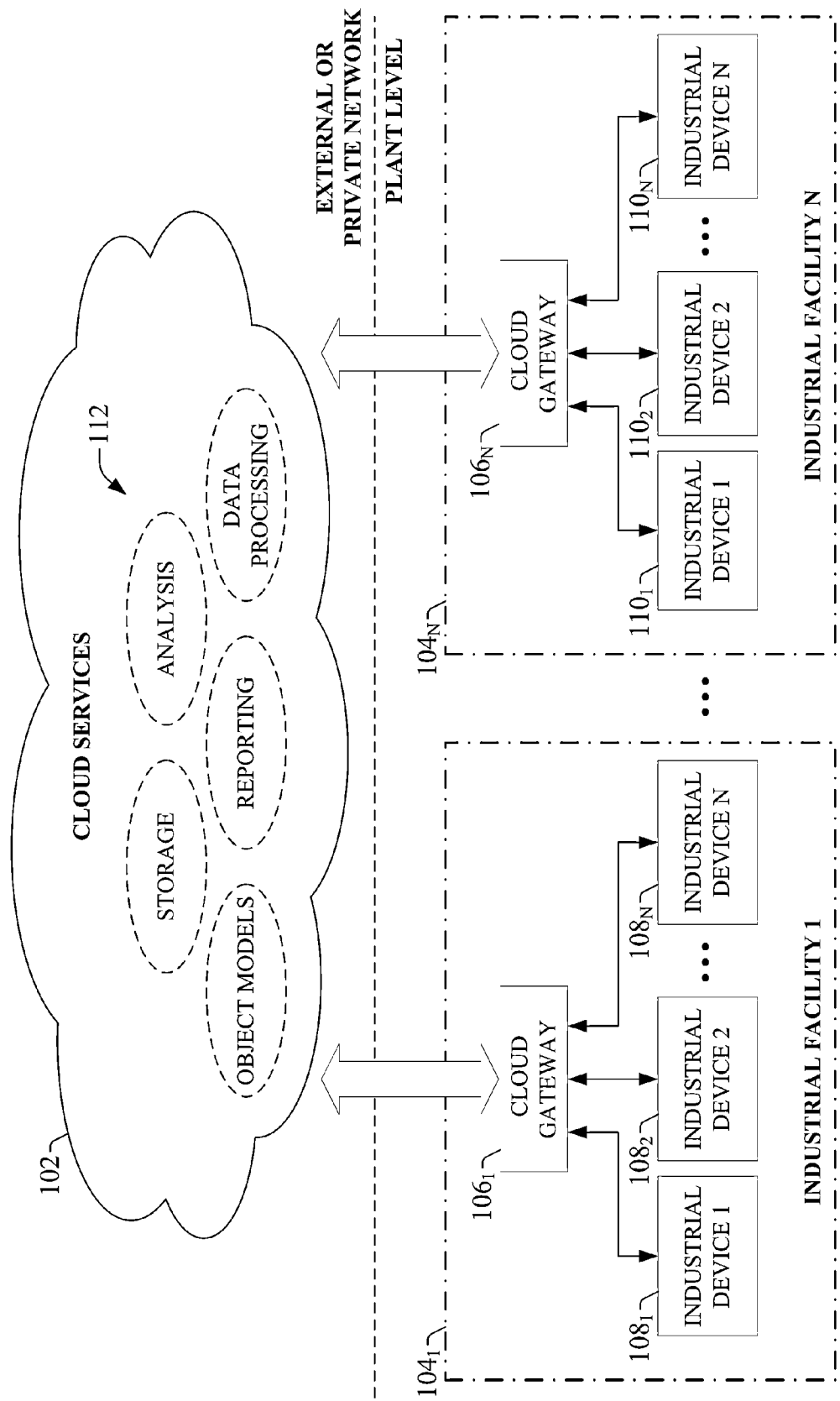
FIG. 1 is a high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback (e.g., manually entered reason codes associated with a downtime condition), electrical or mechanical load over time, and the like are often monitored, and in some cases recorded, on a continuous basis. This data is generated by the many industrial devices that make up a typical automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. The amount of generated automation data further increases as additional plant facilities are added to an industrial enterprise.

The large quantity of data generated by modern automation systems makes it possible to apply a broad range of plant analytics to the automation systems and processes that make up an industrial enterprise or business. However, access to the industrial data is typically limited to applications and devices that share a common network with the industrial controllers that collect and generate the data. As such, plant personnel wishing to leverage the industrial data generated by their systems in another application (e.g., a reporting or analysis tool, notification system, visualization application, backup data storage, etc.) are required to maintain such applications on-site using local resources. Moreover, although a given industrial enterprise may comprise multiple plant facilities at geographically diverse locations (or multiple mobile systems having variable locations), the scope of such applications is limited only to data available on controllers residing on the same local network as the application.

To address these and other issues, one or more embodiments of the present disclosure provide an on-premise cloud gateway system for collection of industrial data from plant-floor devices and transfer of the data to a cloud repository for processing and storage. This gateway-based architecture can facilitate collection of industrial data from data sources at all levels of an industrial enterprise, including but not limited to industrial devices (e.g., controllers, drives, telemetry devices, etc.), data historians, data tables, business-level systems (e.g. enterprise resource planning systems, manufacturing execution systems, accounting systems, etc.), and other such data source. Cloud gateway devices on the plant floor can send the collected data to a cloud-based infrastructure, which intelligently sorts and organizes the acquired data based on contextual and/or user-defined parameters (e.g., time of occurrence of a plant-floor event, priority, etc.).

The cloud gateway architecture utilizes priority message queues and blob storage to decouple transmission of the collected data from processing and use of that data in the cloud platform. The cloud gateway devices can also support torrential data streams and parallel pipes, resulting in high performance data transmission capability. Queue processing services package collected industrial data with customer-specific header information containing customer identification information, processing priority information specifying a relative priority for processing the data in the cloud platform (which may be based on a type of the data; e.g., historical, live, alarm, etc.), and other information that can be leveraged in the cloud platform to identify a type of processing to be performed on the data by the cloud platform's data process services.

The cloud gateway devices can include store-and-forward capabilities that allow the gateway devices to continue collecting data from the plant floor devices even in the event of communication loss to the cloud platform. In order to implement the cloud gateway functionality on computing devices that have limited local storage capabilities, these store-and-forward capabilities can include functionality for redirecting collected data to an external storage device for temporary storage while the communication link to the cloud platform is lost. When communication between the cloud gateway device and the cloud platform is reestablished, the cloud gateway device can retrieve the stored data from the external repository, complete processing of the data, and send the retrieved data to the cloud platform. In some embodiments, the cloud gateway device can send the retrieved data to the cloud platform in parallel with newly collected data to mitigate data congestion on the gateway device.

To provide a general context for the cloud gateway functions described herein, FIG. 1 illustrates a high-level overview of an industrial enterprise that leverages cloud-based services. The enterprise comprises one or more industrial facilities 104, each having a number of industrial devices 108 and 110 in use. The industrial devices 108 and 110 can make up one or more automation systems operating within the respective facilities 104. Exemplary automation systems can include, but are not limited to, batch control systems (e.g., mixing systems), continuous control systems (e.g., PID control systems), or discrete control systems. Industrial devices 108 and 110 can include such devices as industrial controllers (e.g., programmable logic controllers or other types of programmable automation controllers); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the exemplary overview illustrated in FIG. 1 depicts the industrial devices 108 and 110 as residing in fixed-location industrial facilities 104, the industrial devices 108 and 110 may also be part of a mobile control application, such as a system contained in a truck or other service vehicle.

According to one or more embodiments, on-premise cloud gateways 106 can collect data from industrial devices 108 and 110—or from other data sources, including but not limited to data historians, business-level systems, etc.—and send this data to cloud platform 102 for processing and storage. Cloud platform 102 can be any infrastructure that allows cloud services 112 to be accessed and utilized by cloud-capable devices. Cloud platform 102 can be a public cloud accessible via the Internet by devices having Internet connectivity and appropriate authorizations to utilize the services 112. In some scenarios, cloud platform 102 can be provided by a cloud provider as a platform-as-a-service (PaaS), and the services 112 (such as the operator interface system described herein) can reside and execute on the cloud platform 102 as a cloud-based service. In some such configurations, access to the cloud platform 102 and the services 112 can be provided to customers as a subscription service by an owner of the services 112. Alternatively, cloud platform 102 can be a private or semi-private cloud operated internally by the enterprise, or a shared or corporate cloud environment. An exemplary private cloud can comprise a set of servers hosting the cloud services 112 and residing on a corporate network protected by a firewall.

Cloud services 112 can include, but are not limited to, data storage, data analysis, control applications (e.g., applications that can generate and deliver control instructions to industrial devices 108 and 110 based on analysis of real-time system data or other factors), visualization applications such as the cloud-based operator interface system described herein, reporting applications, Enterprise Resource Planning (ERP) applications, notification services, or other such applications. Cloud platform 102 may also include one or more object models to facilitate data ingestion and processing in the cloud. If cloud platform 102 is a web-based cloud, cloud gateway devices 106 at the respective industrial facilities 104 may interact with cloud services 112 directly or via the Internet. In an exemplary configuration, the industrial devices 108 and 110 connect to the on-premise cloud gateways 106 through a physical or wireless local area network or radio link. In another exemplary configuration, the industrial devices 108 and 110 may access the cloud platform 102 directly using integrated cloud gateways. Cloud gateways and their associated data collection and processing services are discussed in more detail below.

Ingestion of industrial device data in the cloud platform 102 through the use of cloud gateways 106 can offer a number of advantages particular to industrial automation. For one, cloud-based storage offered by the cloud platform 102 can be easily scaled to accommodate the large quantities of data generated daily by an industrial enterprise. Moreover, multiple industrial facilities at different geographical locations can migrate their respective automation data to the cloud for aggregation, collation, collective analysis, visualization, and enterprise-level reporting without the need to establish a private network between the facilities. Cloud gateways 106 can be configured to automatically detect and communicate with the cloud platform 102 upon installation at any facility, simplifying integration with existing cloud-based data storage, analysis, or reporting applications used by the enterprise. In another example application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). Moreover, cloud based control applications can perform remote decision-making for a controlled industrial system based on data collected in the cloud from the industrial system, and issue control commands to the system via the cloud gateway. These industrial cloud-computing applications are only intended to be exemplary, and the systems and methods described herein are not limited to these particular applications. The cloud platform 102 can allow software vendors to provide software as a service, removing the burden of software maintenance, upgrading, and backup from their customers.

Figure 2:
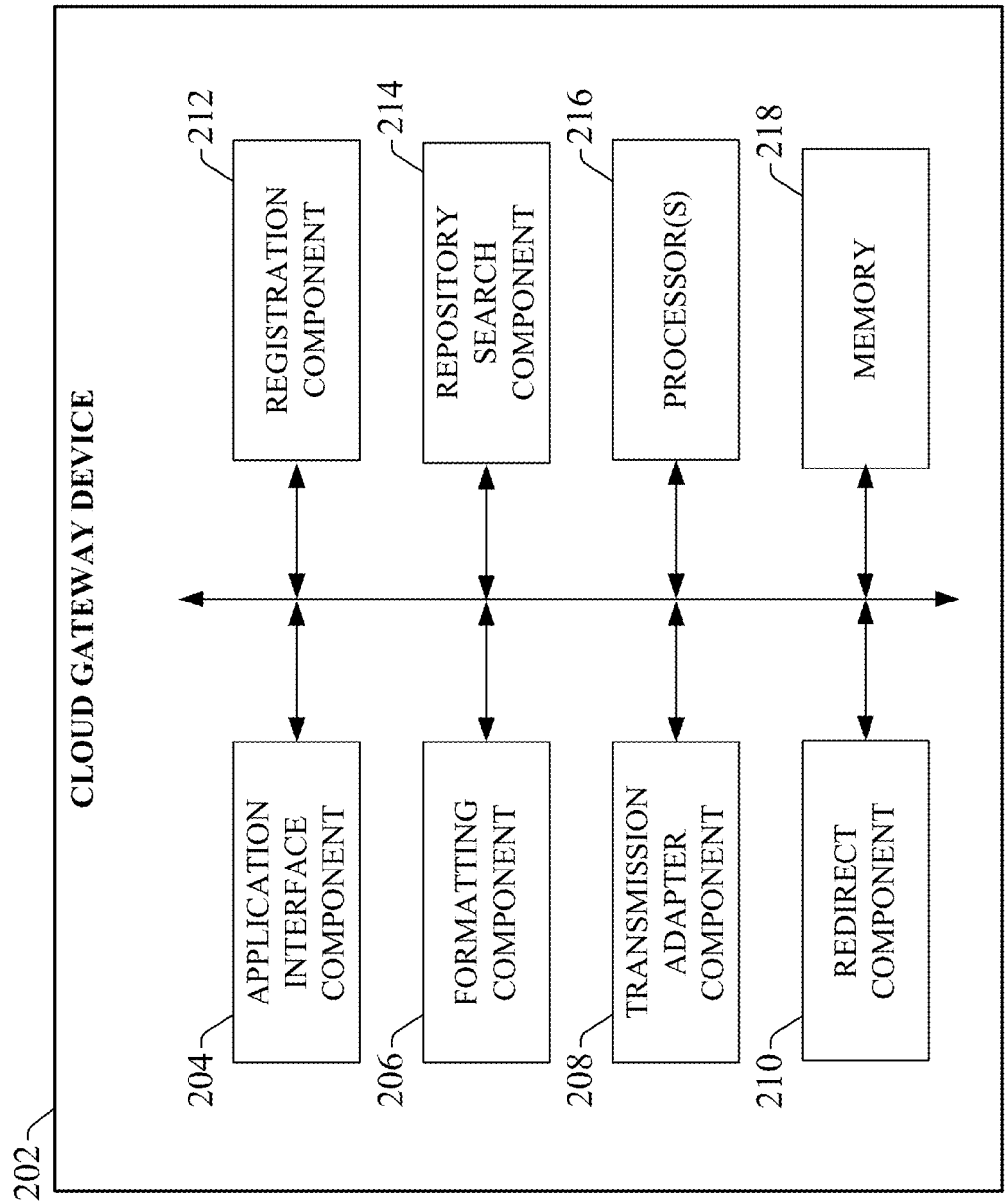
FIG. 2 is a diagram of an example cloud gateway device.

FIG. 2 is a block diagram of an example cloud gateway device 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Cloud gateway device 202 can include an application interface component 204, a formatting component 206, a transmission adapter component 208, a redirect component 210, a registration component 212, a repository search component 214, one or more processors 216, and memory 218. In various embodiments, one or more of the application interface component 204, formatting component 206, transmission adapter component 208, redirect component 210, registration component 212, repository search component 214, the one or more processors 216, and memory 218 can be electrically and/or communicatively coupled to one another to perform one or more of the functions of the cloud gateway device 202. In some embodiments, components 204, 206, 208, 210, 212, and 214 can comprise software instructions stored on memory 218 and executed by processor(s) 216. Cloud gateway device 202 may also interact with other hardware and/or software components not depicted in FIG. 2. For example, processor(s) 216 may interact with one or more external user interface devices, such as a keyboard, a mouse, a display monitor, a touchscreen, or other such interface devices.

Application interface component 204 can be configured to collect industrial device data, either from a data concentrator or directly from the industrial devices themselves. Formatting component 206 can be configured to format the raw data collected from the industrial devices for transport to and processing by the cloud services executing on the cloud platform, thereby normalizing the data collected from disparate industrial data sources according to a common data format. In some embodiments, the formatting component 206 can also perform other pre-processing functions on the collected data, including but not limited to compressing and/or encrypting the data. Transmission adapter component 208 can be configured to package or encapsulate the data into a data packet and send the resulting data packet to the cloud platform over a communication channel.

Redirect component 210 can be configured to control when store-and-forward mode operation is initiated. For example, redirect component 210 can determine whether certain defined conditions indicating loss of cloud communication have been satisfied and, in response, instruct the gateway device 202 to redirect the collected data to an external repository for temporary storage. Registration component 212 can be configured to register the cloud gateway device with a registration server that records and tracks the cloud gateways and external repositories residing on a network (e.g., a plant or office network). The repository search component 214 can be configured to query the registration server for available repositories when store-and-forward mode is initiated.

The one or more processors 216 can perform one or more of the functions described herein with reference to the systems and/or methods disclosed. Memory 218 can be a computer-readable storage medium storing computer-executable instructions and/or information for performing the functions described herein with reference to the systems and/or methods disclosed.

Figure 3:
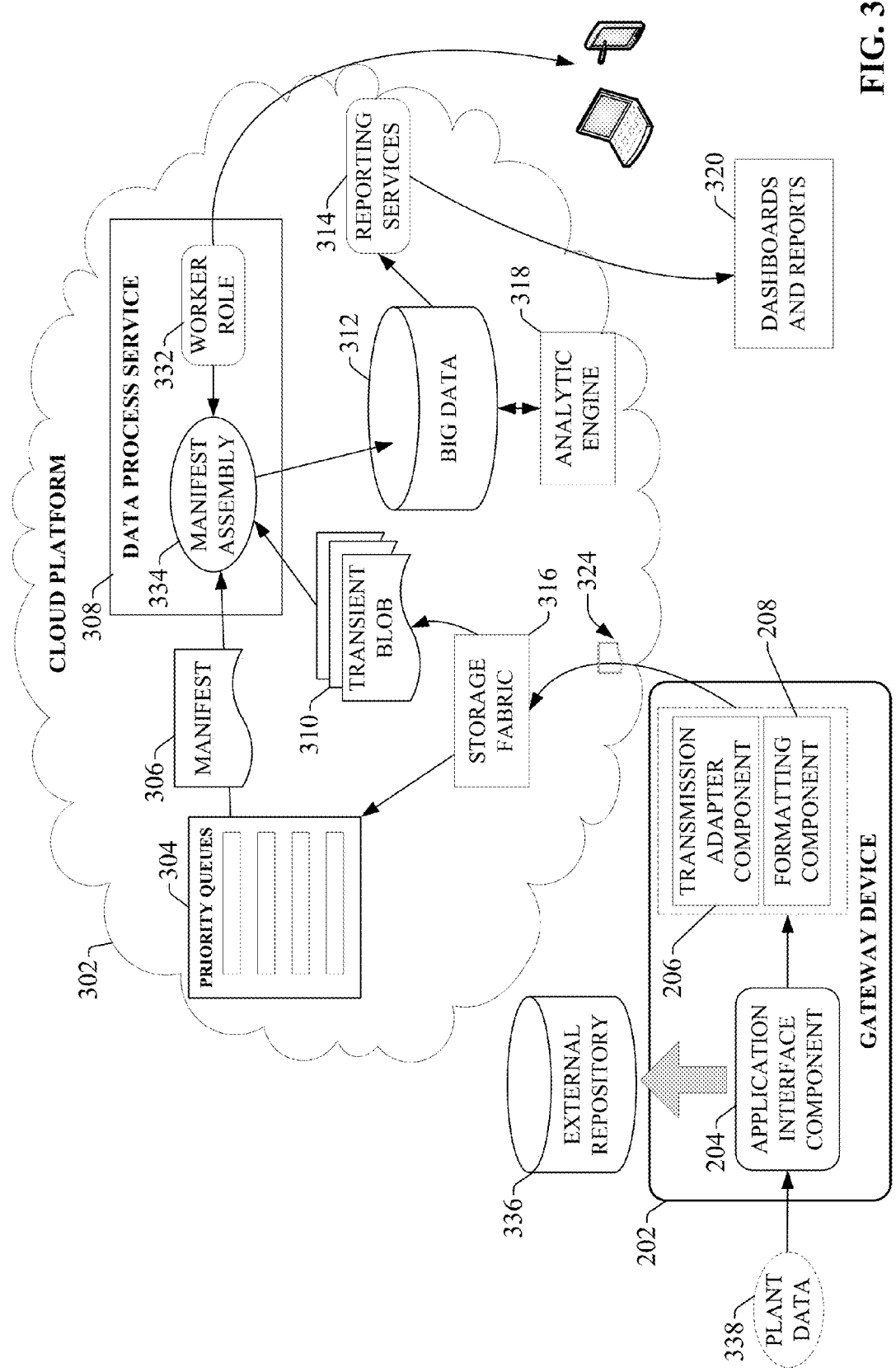
FIG. 3 is an overview of a system that leverages an gateway-based cloud infrastructure to provide data collection and processing services to customer manufacturing sites.

FIG. 3 is an overview of a system that leverages a gateway-based cloud infrastructure to provide data collection and processing services to customer manufacturing sites. This system can provide remote collection and monitoring services in connection with alarm and event notification for critical industrial assets, historical data collection, remote system access, system optimization, remote closed-loop control, and other such applications. The cloud-based infrastructure enables remote monitoring and reporting of on-premise assets by implementing five general areas of functionality—data ingestion into the cloud, object modeling, data processing, data analytics, and reporting.

In the example illustrated in FIG. 3, a gateway device 202 comprises an application interface component 204 that collects plant data 338 from one or more industrial assets (e.g., data generated by one or more industrial controllers, such as industrial devices 108 or 110) at a plant facility. These industrial assets can include industrial controllers that monitor and control industrial I/O devices, data servers and historians, motor drives, remote I/O interfaces that remotely interface groups of I/O devices to one or more of the industrial controllers, boilers or other industrial machines, or other such assets. For example, application interface 204 can monitor one or more controller tags defined in a tag archive and store data in a local data storage (e.g., a local structured query language, or SQL, server). The collected data can include historical data (e.g., alarm history, status history, trend data, etc.), live data values read from the industrial assets, alarm data generated by the industrial assets, or other types of data.

The application interface 204 is configured to collect the live or historical data from the industrial assets, either directly (e.g., via direct hardwired connection, through a common industrial protocol link, or through middleware applications such as OPC clients) or from one or more data historians that collect and store data from the industrial assets. Application interface 204, formatting component 206, and transmission adapter component 208 can execute on any suitable hardware platform (e.g., a server, a LINUX box, etc.), and collectively serve as a generic gateway that collects data items from the various industrial assets on the plant network and packages the collected data according to a generic, uniform data packaging schema used to move the on-premise data to a cloud platform 302. The cloud gateway device 202 provides a software mechanism to dynamically link on-premise-to-cloud gateways, and provides an expandable data type schema that allows new data types to be added without the need to redeploy the monitoring system to the cloud.

Figure 4:
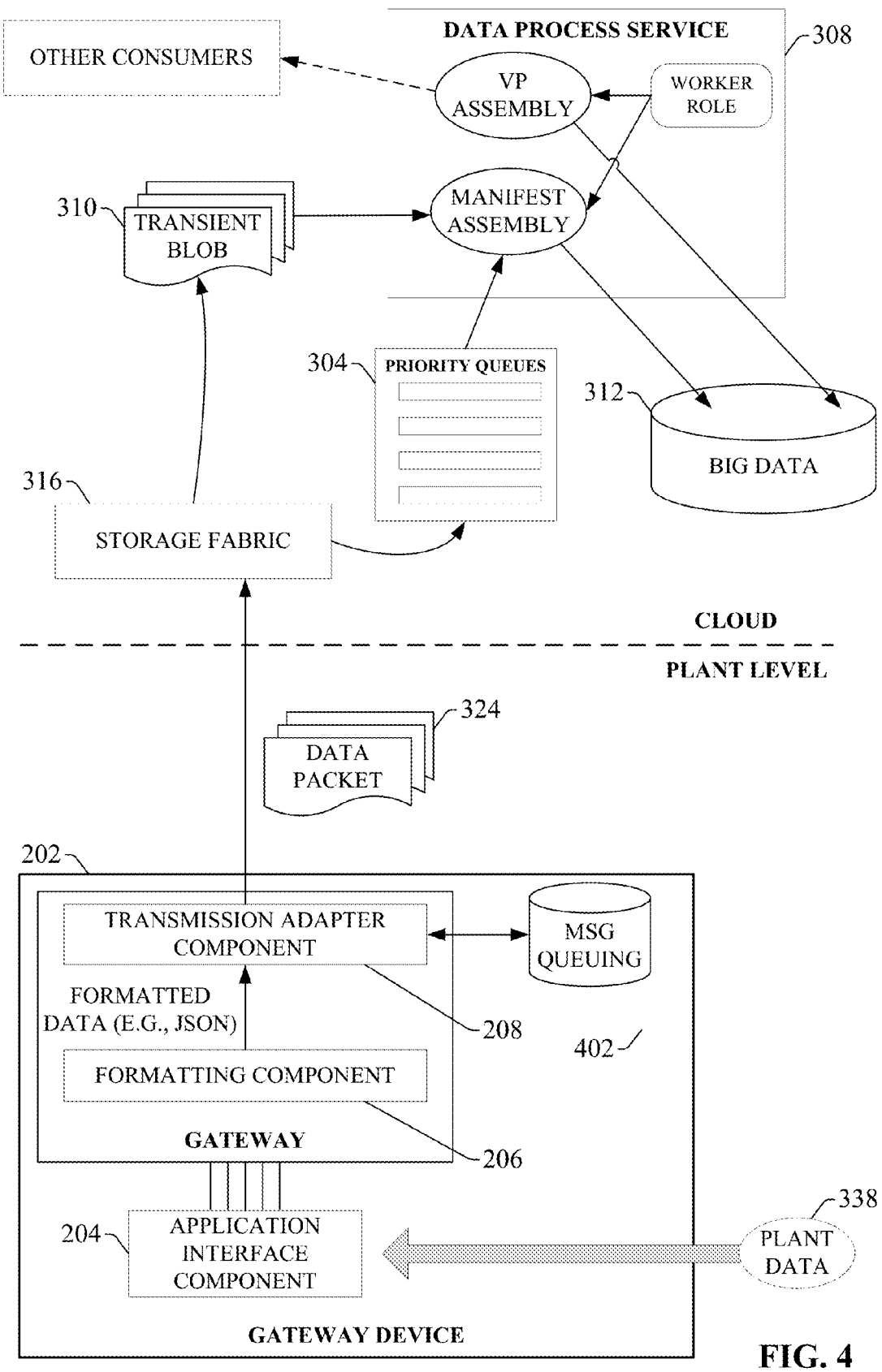
FIG. 4 is a diagram illustrating cloud gateway functionality.

Cloud gateway functionality is illustrated in more detail with reference to FIG. 4. Gateway device 202 executes application interface 204, which facilitates collection of on-premise data at the plant facility. In an example scenario, plant data 338 may comprise stamping press time-series sensor data, made up of thousands of data points updated at a rate of less than a second.

Application interface 204 implements collection services that collect device data, either directly from the devices themselves via a common industrial protocol (CIP) link or other suitable communication protocol, or from a separate data storage (e.g., via an SQL query) that serves as a data concentrator for the industrial devices. The application interface 204 then provides the collected data to gateway services implemented by the formatting component 206 and transmission adapter component 208 for processing and delivery to the cloud platform. For example, formatting component 206 can convert the data to a normalized format required by the cloud services for collective processing of the data. In some embodiments, formatting component 206 may convert the plant data to JavaScript Object Notation (JSON) format, which allows the data to be easily parsed and analyzed by the cloud-based analytics services. However, other embodiments of formatting component 206 may convert the data to other formats suitable for data transfer and processing.

The formatting component 206 streams the formatted data to the transmission adapter component 208, which compresses and stores the formatted data in a compressed data file. Queue processing services executed by transmission adapter component 208 can then read the compressed data file and reference a message queuing database 402, which maintains and manages customer-specific data collection configuration information, as well as information relating to the customer's subscription to the cloud platform and associated cloud services. Based on configuration information in the message queuing database 402, transmission adapter component 208 packages the compressed data file into a data packet, and pushes the data packet 324 to the cloud platform. Message queuing database 402 can include site-specific information identifying the data items to be collected (e.g., data tag identifiers), user-defined processing priorities for the data tags, firewall settings that allow cloud gateway device 202 to communicate with the cloud platform through a plant firewall, and other such configuration information. Configuration information in message queuing database 402 instructs cloud gateway device 202 how to communicate with the identified data tags and with the remote data collection services on the cloud platform.

Figure 5:
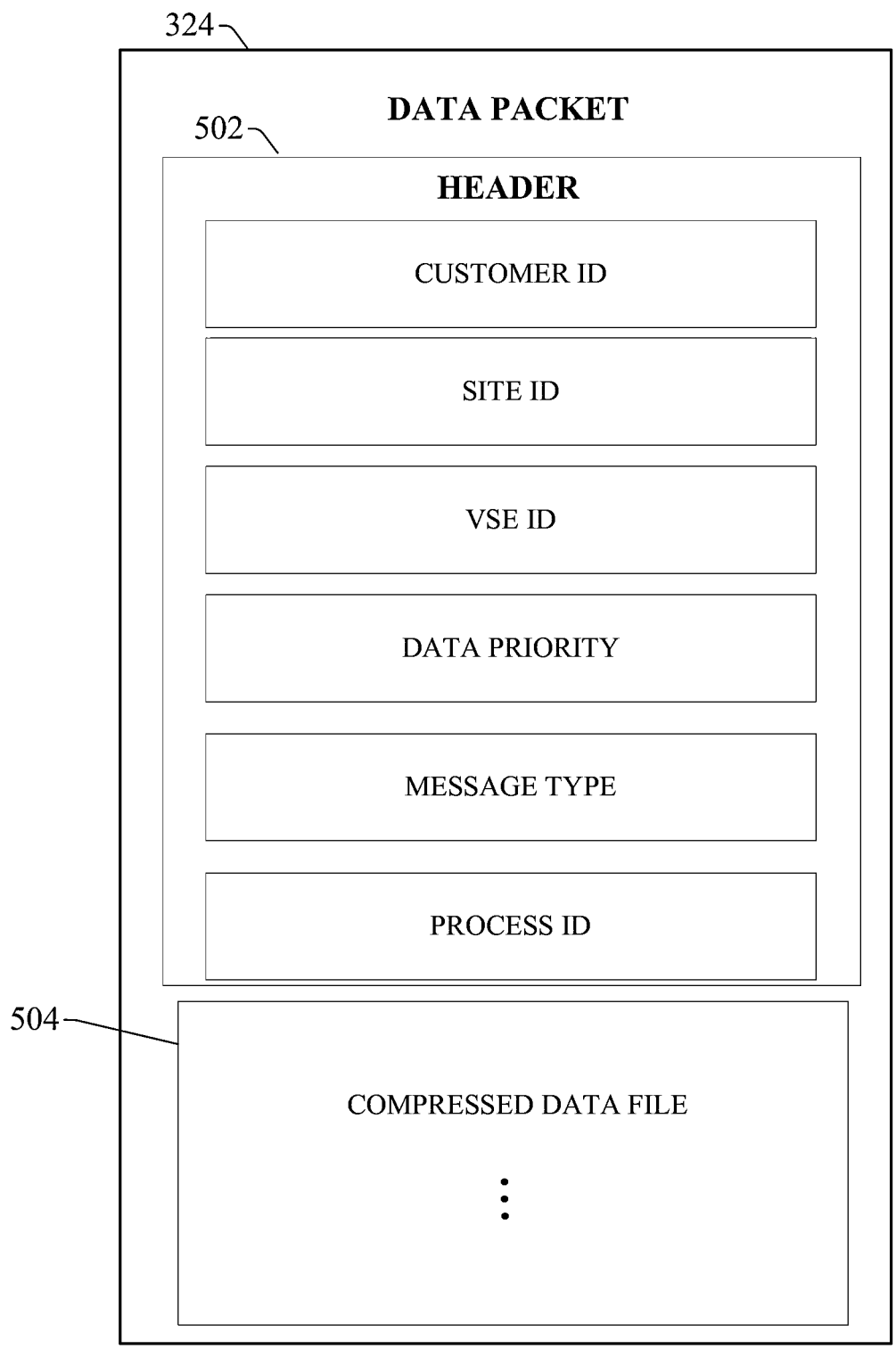
FIG. 5 is a diagram illustrating a data packet generated by a cloud gateway device.

An example compressed data packet is illustrated in FIG. 5. As shown, the transmission adapter component's message queuing services add a header 502 to compressed data file 504 to yield the compressed data packet 324. The header 502 contains customer-specific data read from message queuing database 402. For example, header 502 can include a unique customer identifier, a site identifier representing a particular plant facility, a virtual support engineer identifier, a data priority for the data in the compressed data file 504, a message type, and a process identifier that specifies a particular manifest application on the cloud platform that should be used to process the data on the cloud Packaging the data in this way can allow data from diverse data sources to be packaged together side. using a uniform, generic data packaging schema so that the data can be moved to the cloud infrastructure In addition to collection and migration of data, one or more embodiments of gateway device 202 can also perform local analytics on the data prior to moving the data to the cloud platform. This can comprise substantially any type of pre-processing or data refinement that may facilitate efficient transfer of the data to the cloud, prepare the data for enhanced analysis in the cloud, reduce the amount of cloud storage required to store the data, or other such benefits. For example, transmission adapter component 208 may be configured to aggregate data by combining related data from multiple sources. For example, data from multiple sensors measuring related aspects of an automation system can be identified and aggregated into a single cloud upload packet by transmission adapter component 208. In such scenarios, the transmission adapter component 208 can be configured to identify related data based in part on data fields contained in the formatted data streams provided by formatting component 206, and/or information in the message queuing database 402. Transmission adapter component 208 may also encrypt sensitive data prior to upload to the cloud. In yet another example, transmission adapter component 208 may filter the data according to any specified filtering criterion (e.g., filtering criteria defined in a filtering profile stored on the cloud gateway device 202). For example, defined filtering criteria may specify that pressure values exceeding a defined setpoint are to be filtered out prior to uploading the pressure values to the cloud.

Cloud gateway device 202 may also associate metadata with selected subsets of the data prior to migration to the cloud, thereby contextualizing the data within the industrial environment. For example, application interface component 204 or transmission adapter component 208 can tag selected subsets of the data with a time indicator specifying a time at which the data was generated, a quality indicator, a production area indicator specifying a production area within the industrial enterprise from which the data was collected, a machine or process state indicator specifying a state of a machine or process at the time the data was generated, a personnel identifier specifying an employee on duty at the time the data was generated, or other such contextual metadata. In this way, cloud gateway device 202 can perform layered processing of the collected data to generate meta-level knowledge that can subsequently be leveraged by cloud-based analysis tools to facilitate enhanced analysis of the data in view of a larger plant context.

To ensure secure outbound traffic to the cloud, one or more embodiments of cloud gateway device 202 can support HTTPS/SSL, certificate authority enabled transmission, and/or unique identity using MAC addresses. Cloud gateway device 202 can also support store-and-forward capability to ensure data is not lost if the gateway device becomes disconnected from the cloud during data collection. As will be discussed in more detail below, this store-and-forward capability can be adapted to leverage external storage repositories (e.g., external repository 336 of FIG. 3) to temporarily store new data while the connection to the cloud is lost. In this way, the cloud gateway services can be implemented on lightweight gateway devices having small amounts of internal storage capacity.

Returning now to FIG. 3, cloud gateway device 202 sends compressed data packet 324 to the cloud-based data collection and monitoring system on cloud platform 302 via a cloud storage fabric 316. The data packet 324 conveys parameters and data (compressed and serialized) used by the cloud-side services to reconstruct the domain data structure in the cloud using auxiliary tenant-level manifests. The cloud services direct remote storage of the received data into preconditioned transient blobs 310. The cloud platform 302 can use agent reasoning and collective bargain features to determine a data storage locale.

Through specialized cloud administrator interfaces, users at the plant facility can dynamically configure one or more priority queues 304 that respectively define how the data packets are processed in the cloud platform 302. For example, separate queues may be defined for alarms, live data, and historical data, allowing data to be organized according to these data types. The historical data queue can relate to time-series records, which can be accessed through an application programming interface (API) (e.g., an SQL API or other suitable API). The alarms queue can relate to abnormal situations, where the alarm data can also be accessed through the API. This alarms queue can comprise multiple queues associated with different alarm priorities, to allow for individual processing for different alarms having different levels of criticality. In some embodiments, servers, controllers, switches, etc., can be monitored using a number of protocols, and at a certain point (e.g., at the end of a monitoring cycle) alarms can be queued and cloud gateway device 202 can send the alarms to the cloud. Alarms can be reactive (e.g., alarms that trigger when a motor fails, when a CPU crashes, when an interlock is tripped, etc.) or proactive (e.g., a monitoring system may track consumables on a machine and generate an alarm when time to reorder, monitor cycle counts on a machine and generate an alarm when to schedule preventative maintenance, generate an alarm when temperatures fall outside defined bandwidths, send a notification when a computer's memory is 80% full, etc.).

The live data queue can relate to substantially real-time monitored data, such as current temperatures, current pressures, etc. The live data values can also be accessed through the API (e.g., a SQL API). The queues described above are not intended to be limiting, and it is to be appreciated that other types of priority queues can be defined according to the needs of the end user. For example, queues may be defined for specific devices or device types (e.g., motor drives) for uploading of device parameter and/or performance data.

In some embodiments, the cloud administrator interfaces can allow the user to define these priority queues 304 from the on-site location and to define how data in each queue is handled. For example, the user can define, for each queue, an upload frequency, a priority level (e.g., which data queues should take processing priority over other data queues), identities of cloud partitions or databases in which data from the respective queues should be stored, and other such information. In an example scenario, the live data queue may be defined to process live data values that are to be used by a remote operator interface application to view substantially real-time data from the plant facility, while historical data queue may be used to process historian data for archival storage in a historical database on cloud storage. Accordingly, the live data queue may be assigned a higher priority relative to the historical data queue, since data in the live data queue is more time-critical than data in the historical queue.

Through the administrator interfaces, users can assign priorities to respective data tags or tag groups at the customer site. These priority assignments can be stored in the message queuing database 402 of the cloud gateway device 202. Accordingly, when transmission adapter component 208 packages the collected data to be moved to the cloud platform, the collected data items can be packaged into data packets according to priority (as defined in message queuing database 402), and the respective data packet headers populated with the appropriate priority level. If access to the cloud is unavailable, data will continue to be collected by application interface component 204, and the incoming data will be temporarily routed to an external storage repository for subsequent retrieval. When communication to the cloud is restored, cloud gateway device 202 will retrieve stored data from the external repository and forward the data to cloud storage. Queue processing services can also encrypt and send storage account keys to the cloud platform for user verification.

When cloud gateway device 202 sends a data packet to the cloud-based remote processing service (using transmission adapter component 208), the service reads the packet's header information to determine a priority assigned to the data (e.g., as defined in a data priority field of the data packet) and sends the data packet (or the compressed data therein) to a selected one of the user defined priority queues 304 based on the priority. On the other side of the priority queues 304, a data process service 308 processes data in the respective priority queues 304 according to the predefined processing definitions. The data processing service includes a worker role 332 that determines how the queued data is to be processed based on manifests (e.g., system manifests, tag manifests, and metric manifests) stored in a customer-specific manifest assembly 334. Manifests define and implement customer-specific capabilities, applications, and preferences for processing collected data in the cloud. Manifests can be dynamically uploaded by a user at the plant facility through a specialized user interface, which facilitates dynamic extension of cloud computing capability.

For example, if new data points are to be added to the data collection system that require creation of a new data queue, the user can configure a new manifest for the new queue, the manifest defining such aspects as processing priority for the data, upload frequency for the data, where the data is to be routed or stored within cloud storage, and other such information. The new manifest 306 can then be uploaded to the cloud and added to the customer's manifest assembly 334 with the other manifests defined for the customer, so that worker role 332 can leverage the new manifest 306 to determine how data in the new queue is to be processed. This new manifest 306 need only be uploaded to the cloud-based remote monitoring service once. Thereafter, data placed in the new priority queue will be processed by worker role 332 according to the new manifest 306 stored in the customer's manifest assembly 334. For example, the manifest may define where the data is to be stored within cloud storage (e.g., in a historical database, and Alarms and Live Data database, big data storage 312, etc.), and whether processing of the new data queue is to take priority over other data queues. In some embodiments, the manifest assembly 334 may only accept a new manifest if the manifest is accompanied by a unique key associated with the client.

Once the cloud-based remote monitoring infrastructure has processed and stored the data provided by cloud gateway device 202 according to the techniques described above, the data can be made accessible to client devices 322 for viewing. Data analysis on the cloud platform 302 can provide a set of web-based and browser enabled technologies for retrieving, directing, the data from the cloud platform 302 to the client devices 322. To this end, reporting services 314 can deliver data in cloud storage (e.g., from the big data storage 312) to the client devices 322 in a defined format. For example, reporting services 314 can leverage collected data stored in the cloud repository to provide remote operator interfaces to client devices 322 over the Internet. An analytic engine 318 executing on the cloud platform 302 can also perform various types of analysis on the data stored in big data storage 312 and provide results to client devices 322.

Figure 6:
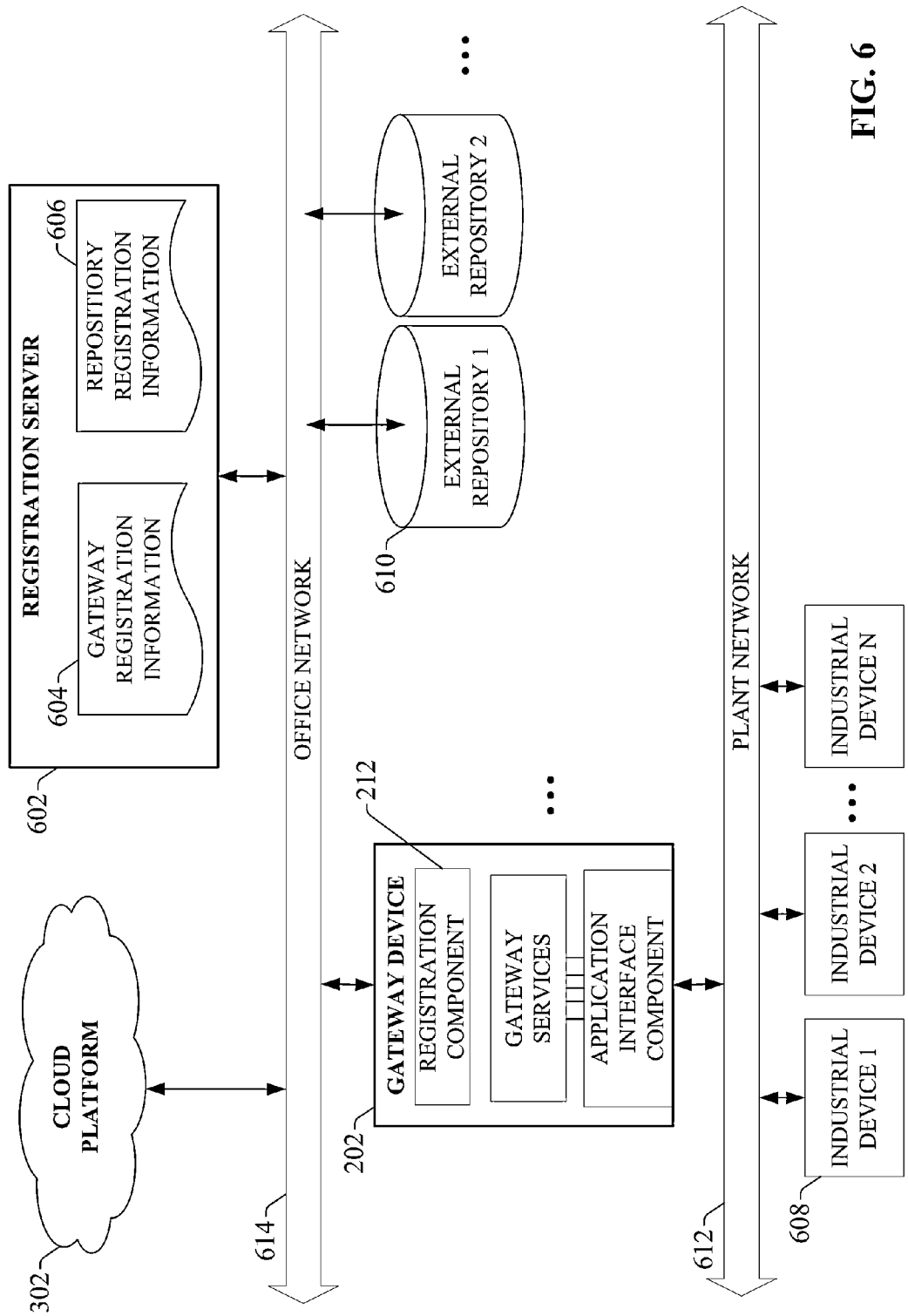
FIG. 6 is a diagram illustrating an example industrial network architecture that includes a gateway device for collection and migration of industrial data to cloud platform.

FIG. 6 is a diagram illustrating an example industrial network architecture that includes a gateway device 202 for collection and migration of industrial data to cloud platform 302. In this example, the application interface component of gateway device 202 interfaces with industrial devices 608 via a plant network 612 (e.g., a common industrial protocol network, an Ethernet or EthernetIP network, etc.). Gateway services implemented by the formatting component and transmission adapter component process the collected data as described above to form data packets, which are then sent to the cloud platform 302 for storage, processing, and/or analysis in accordance with customer-specific manifests executed on the cloud platform. In the illustrated example, the gateway device 202 links to the cloud platform via an office network 614 (e.g., via a firewall device or other secure channel), which is separate from the plant network 612 in order to isolate the industrial devices 608 from the Internet. However, in some configurations the industrial devices 608 may reside on a network with access to the Internet or other external network on which cloud platform 302 resides. In such configurations, gateway device 202 may interface with both the industrial devices 608 and cloud platform 302 over the same network. In yet another configuration, the gateway device 202 may interface with industrial devices 608 via direct hardwired connections rather than communicating with the devices over a plant network 612.

As noted above, the gateway services executed by gateway device 202 can support store-and-forward capabilities that allow the application interface component to continue collecting industrial data from industrial devices 608 even if communication between gateway device 202 and cloud platform 302 is lost. To allow the gateway services to be implemented on lightweight computing devices with limited local storage capacity (e.g., LINUX boxes or other devices with limited local storage capacity), the gateway services can be configured to temporarily store the incoming industrial data on external data stores or repositories. Accordingly, in the event that communication between the gateway device 202 and cloud platform 302 is lost, gateway device 201 can discover and access an external data repository and begin moving the incoming industrial data to this external repository.

To this end, one or more external data repositories 610 are installed on network 614. These data repositories can comprise substantially any type of data storage device, including but not limited to dedicated stand-alone memory devices, flash drives, data historians, multi-purpose computing devices with surplus data storage capability, or other such devices. To facilitate discovery of a suitable external repository, gateway device 202 can be configured to access a registration server 602 residing on network 614. Registration server 602 contains registration information pertaining to devices that reside on network 614. This registration information can include, but is not limited to, device identifiers, network addresses, and other relevant information about each device. In this example, registration server 602 maintains repository registration information 606 identifying the available external data repositories 610 residing on network 614. In some scenarios, repository registration information 606 may be entered manually by a system administrator as each repository is added to the network 614. Alternatively, the external data repositories 610 may be configured to automatically register with registration server 602 upon attachment to network 614. For example, when a new storage device is added to network 614 to serve as a data repository, the storage device may broadcast a data packet identifying itself as an external repository available to receive and store industrial data from a gateway device or other data source. Upon receiving and translating this packet, the registration server 602 can perform any necessary handshaking required to establish communication with the the new storage device, and solicits the storage device for any additional information required to register the storage device (e.g., device name or identifier, available storage capacity, etc.), if such information was not included in the initial data packet.

Likewise, when gateway device 202 is added to network 614, registration component 212 sends a data packet over the network identifying itself as a cloud gateway device, and registration server 602 registers the gateway device 202 as gateway registration information 604 in response to detection of the packet. Information registered on registration server 602 for the gateway device 202 can include, but is not limited to, device name or identifier, a number of industrial data points being collected by the gateway device 202, an expected or actual rate at which industrial data is collected by the gateway device 202, a work area or machine for which the gateway device 202 collects data, or other such information. In this way, registration server 602 tracks the gateway devices and external repositories that are installed on network 614 so that interactions between these devices during a store-and-forward event can be coordinated.

Figure 7:
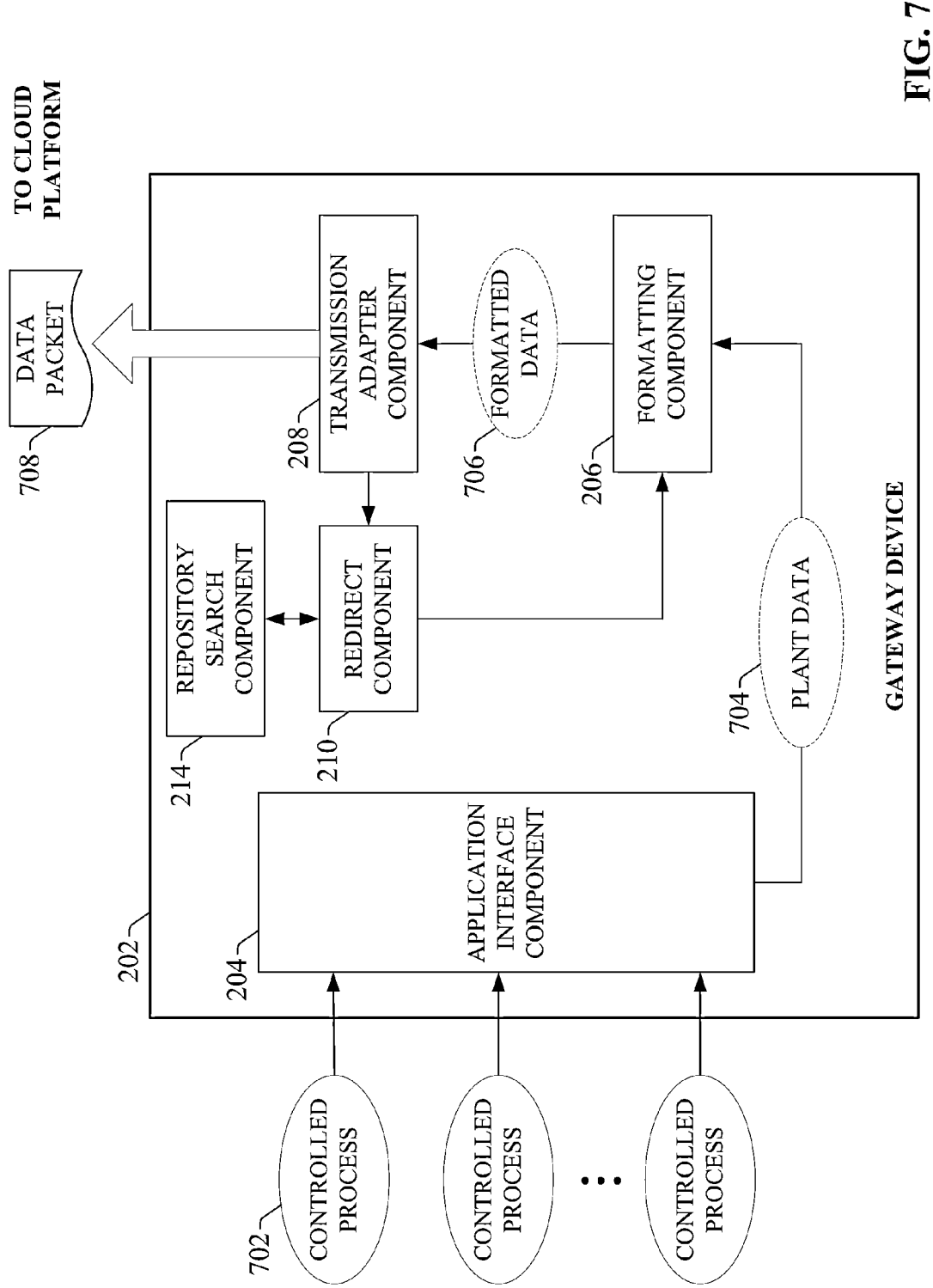
FIG. 7 is a diagram of an example gateway device illustrating data collection and migration during normal operation.

FIG. 7 is a diagram of an example gateway device 202 illustrating data collection and migration during normal operation. As described in previous examples, application interface component 204 receives raw industrial data from devices of one or more controlled processes 702. Data collected from the controlled processes 702 can include, for example, configuration and operational data read from data tags of one or more industrial controllers (e.g., programmable logic controllers or other types of controller), motor configuration and operation data read from one or more motor drives, measurement data read from telemetry devices (e.g., temperature meters, flow meters, pressure meters, etc.), industrial data stored in one or more data historians, or other such device data. The application interface component 204 provides this plant data 704 to formatting component 206, which transforms the plant data to conform to a format suitable for processing by cloud platform services. This can include, for example, structuring data value extracted from the plant data to accord with a data schema expected by the cloud services (e.g. a JSON format that structures the data as name-value pairs, or another suitable data structure).

The resulting formatted data 706 is provided to transmission adapter component 208, which compresses the formatted data 706 to yield a compressed data file. The transmission adapter component 208 then encapsulates the compressed data file within a data envelop comprising customer-specific information obtained from a message queuing database (e.g., message queuing database 402 of FIG. 4) to yield a data packet 708 (e.g., a data packet having a format illustrated in FIG. 5), which is sent to the cloud platform for priority queue processing, as described above in connection with FIG. 3.

Figure 8:
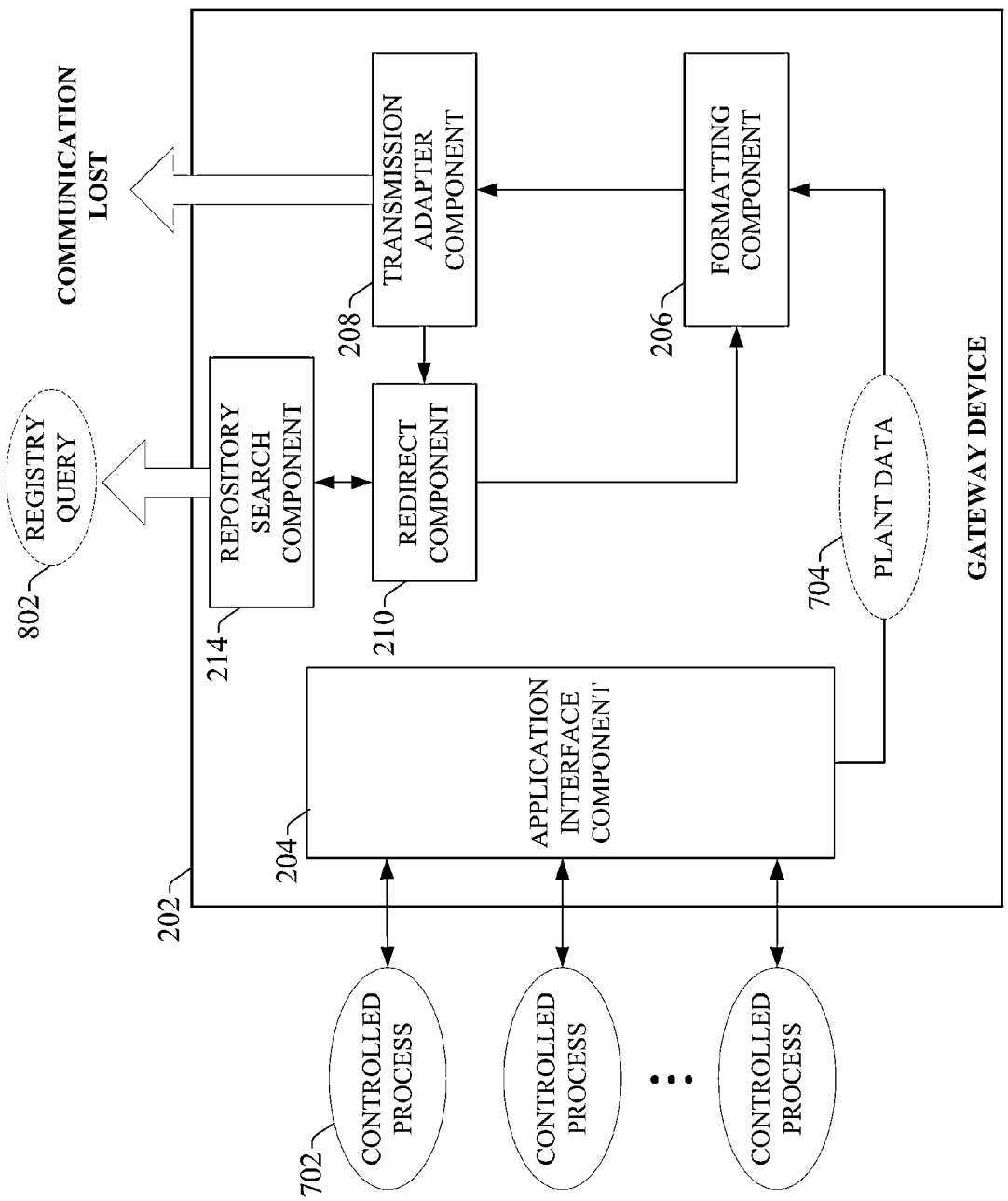
FIG. 8 is a diagram of an example gateway device illustrating querying of a registration server upon loss of communication to a cloud platform.

The data collection, processing, and transmission functions illustrated in FIG. 7 will continue until an external event instructs the gateway device to cease operation, or until communication between the gateway device and the cloud platform is lost. As illustrated in FIG. 8, in response to loss of communication to the cloud platform, redirect component 210 will detect the communication loss, place the gateway device 202 in store-and-forward mode, and instruct repository search component 214 to output a registry query 802 on the network. In some embodiments, the redirect component 210 may not immediately place the gateway device 202 in store-and-forward mode in response to detection of the communication loss, but rather will make a determination regarding whether another defined store-and-forward criteria has been satisfied. For example, when communication to the cloud platform has been lost, data collected from the industrial processes will continue to be collected and stored on the gateway device in local storage. When a defined percentage of the gateway device's local storage has been consumed (the store-and-forward criterion), the redirect component 210 will the instruct the repository search component 214 to send the registry query 802 to the registration server 602. This technique can prevent premature redirecting of data to external storage in the event of a brief communication loss, effectively "debouncing" the store-and-forward mode.

Figure 9:
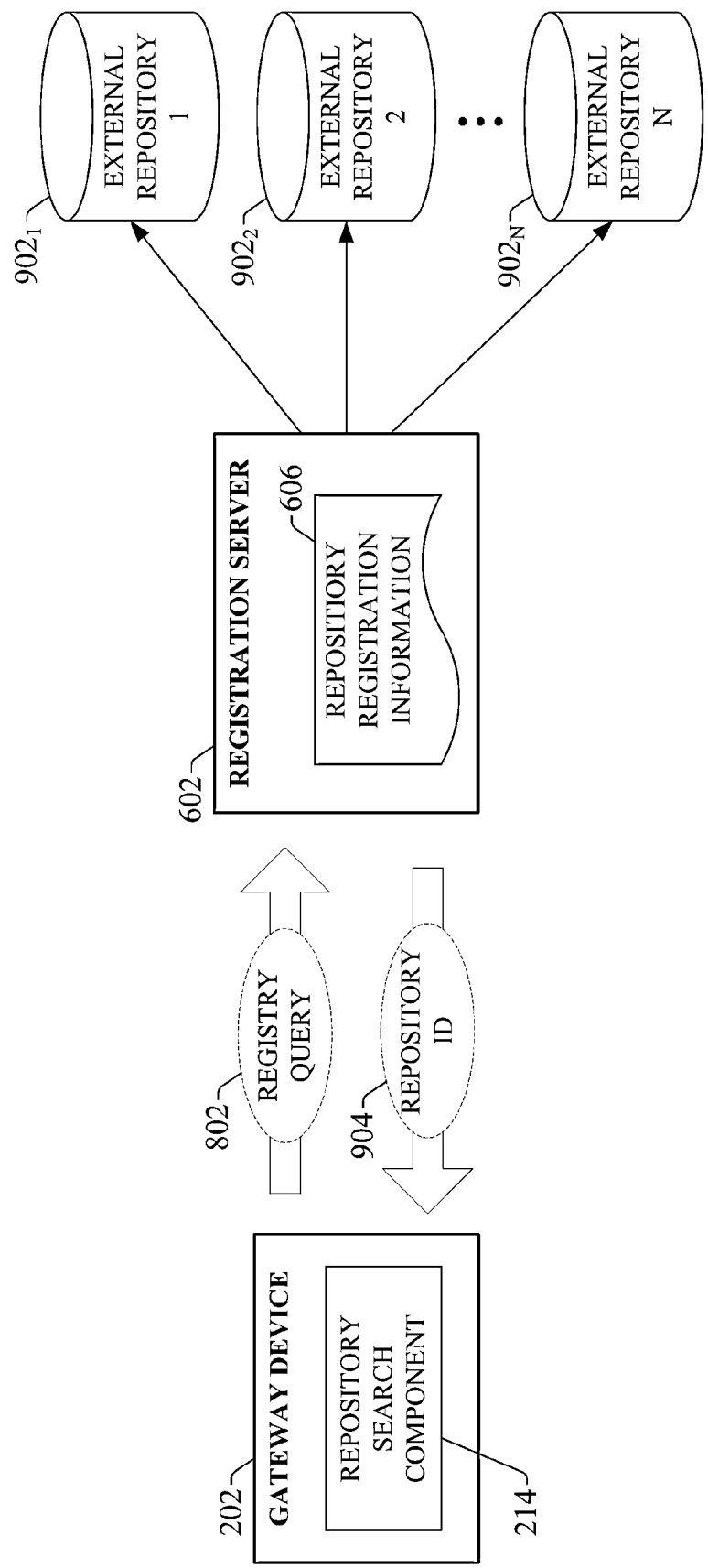
FIG. 9 is a diagram illustrating data exchange between a cloud gateway device and a registration server in response to a request for an available data repository by the cloud gateway device.

Registry query 802 can comprise a data packet containing information identifying the gateway device 202 (e.g., a device name or identifier) and indicating that communication with the cloud platform has been lost. The repository search component 214 directs the registry query 802 to the registry server 602, as illustrated in FIG. 9. In response to receipt of the registry query 802, the registry server 602 accesses repository registration information 606 to identify a registered repository capable of receiving redirected plant data from the gateway device 202.

As illustrated in FIG. 9, multiple registered external repositories 902 (repositories 1-N) reside on the network. The registered repositories can comprise any suitable type of storage device, including but not limited to networked hard drives, historian devices, dedicated storage computers, or other such storage devices. In the event that multiple external repositories 902 are registered on the network, registration server can select a repository using any suitable predefined selection criterion. For example, in some embodiments, repository registration information 606 may be periodically updated to include current status information for each of the registered repositories 902. This status information may include a current available storage capacity for each repository 902, a current rate at which data is being received by each repository 902 (e.g., from other gateway devices or from other data sources), a number of data streams currently being received by each repository 902, or other such status information.

The registration server 602 can apply a defined selection criterion based on this status information to select one of the repositories 902 for receipt of redirected data streams from the gateway device 202. For example, the selection criterion may specify that the repository with the most available storage capacity or the fewest number of incoming data streams from other data sources is to be selected. In another example, the registration server 6002 may perform a predictive analysis on the repository registration information to determine which repository 902 satisfies the selection criterion. For example, the registration server 602 may determine, for each repository 902 based on the status information specified in the repository registration information 606, a duration of time for which the repository can accept a redirected data stream from the gateway device 202 before the repository's available storage space is filled. This determination can be based on the current amount of available storage reported for the repository, an expected rate of data transmission from the gateway device 202 (which may be determined based on the number of industrial data points being collected by the gateway device, as determined from the gateway registration information 604), and a current rate at which data is being received at the repository from other data sources (e.g., other gateway devices or other data sources). The registration server 602 can then determine the repository capable of receiving the redirected data from gateway device 202 for the longest duration, and select this repository as the recipient for the redirected data.

Once registration server 602 has selected a suitable repository 902 for temporary storage of plant data from gateway device 202, the registration server sends a repository ID packet 904 to the gateway device 202. The repository ID packet 904 identifies the selected repository to which the gateway device 202 is to begin redirecting its collected plant data. Upon receipt of the repository ID packet, the repository search component 214 of gateway device 202 performs a handshaking sequence with the identified repository by sending a redirect request to the selected repository over the network. If the repository responds to the request by sending an acceptance signal to the gateway device 202, the gateway device 202 will begin sending redirected data to the repository over the network. If the selected repository denies the request, the gateway device 202 can send a subsequent repository query to the registration server 602 requesting identification of a different repository.

Figure 10:
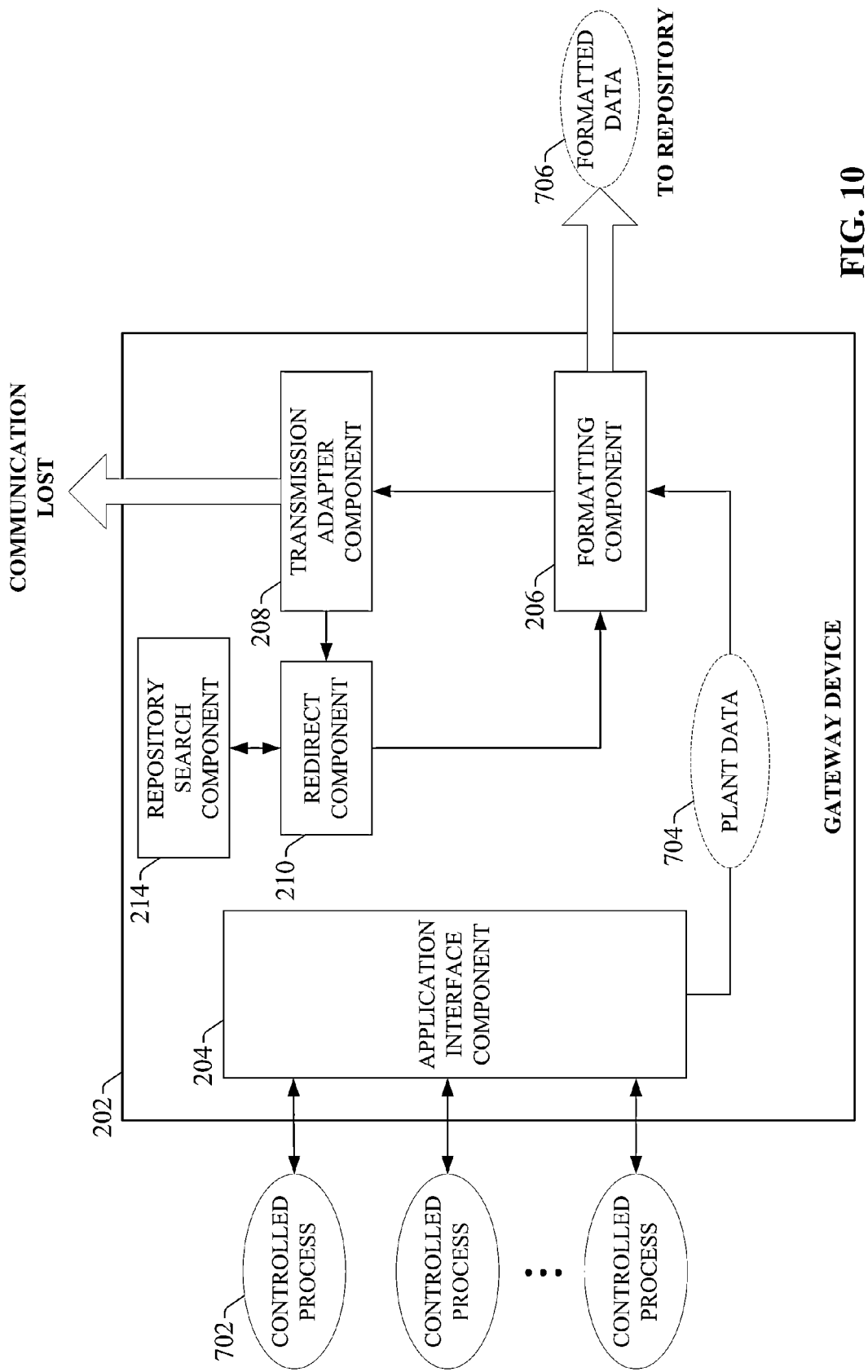
FIG. 10 is a diagram illustrating redirection of plant data by a gateway device while in store-and-forward mode.
Figure 11:
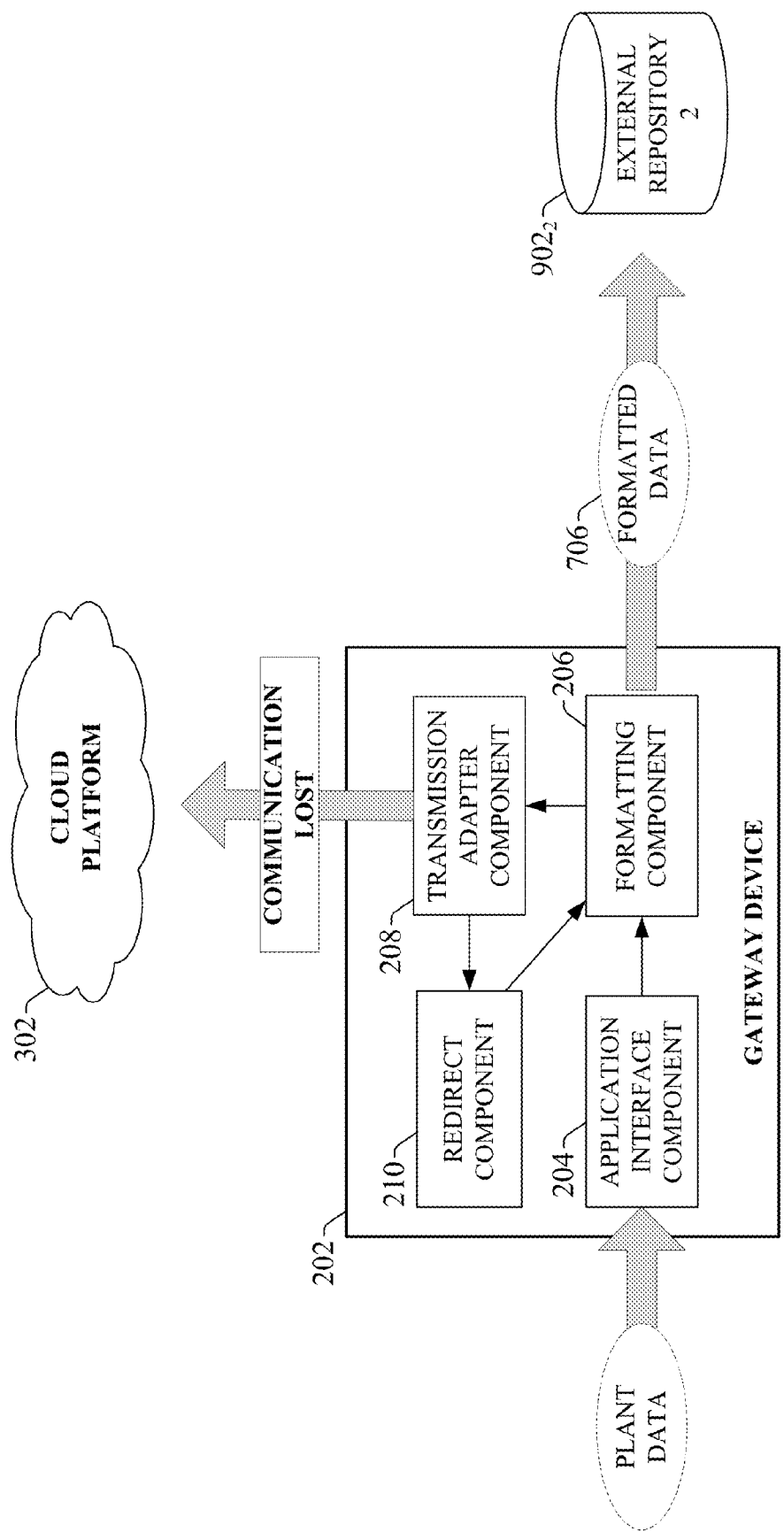
FIG. 11 is a diagram illustrating forwarding of formatted data to a selected external repository by a cloud gateway device.

FIG. 10 is a diagram illustrating redirection of plant data by the gateway device while in store-and-forward mode. In this example, the application interface component 204 continues to collect plant data 704 from controlled processes 702, and formatting component 206 continues to format the plant data as described previously. In contrast to normal operation, the redirect component 210 instructs the gateway device 202 to send the formatted data 706 to the selected data repository rather than sending the formatted data 706 to transmission adapter component 208 for encapsulation and migration of the data to the cloud platform. As illustrated in FIG. 11, external repository $902_2$ has been selected to temporarily store the formatted data 706. Gateway device 202 continues to send the formatted data 706 to the selected repository as long as communication to the cloud platform 302 remains unavailable.

Figure 12:
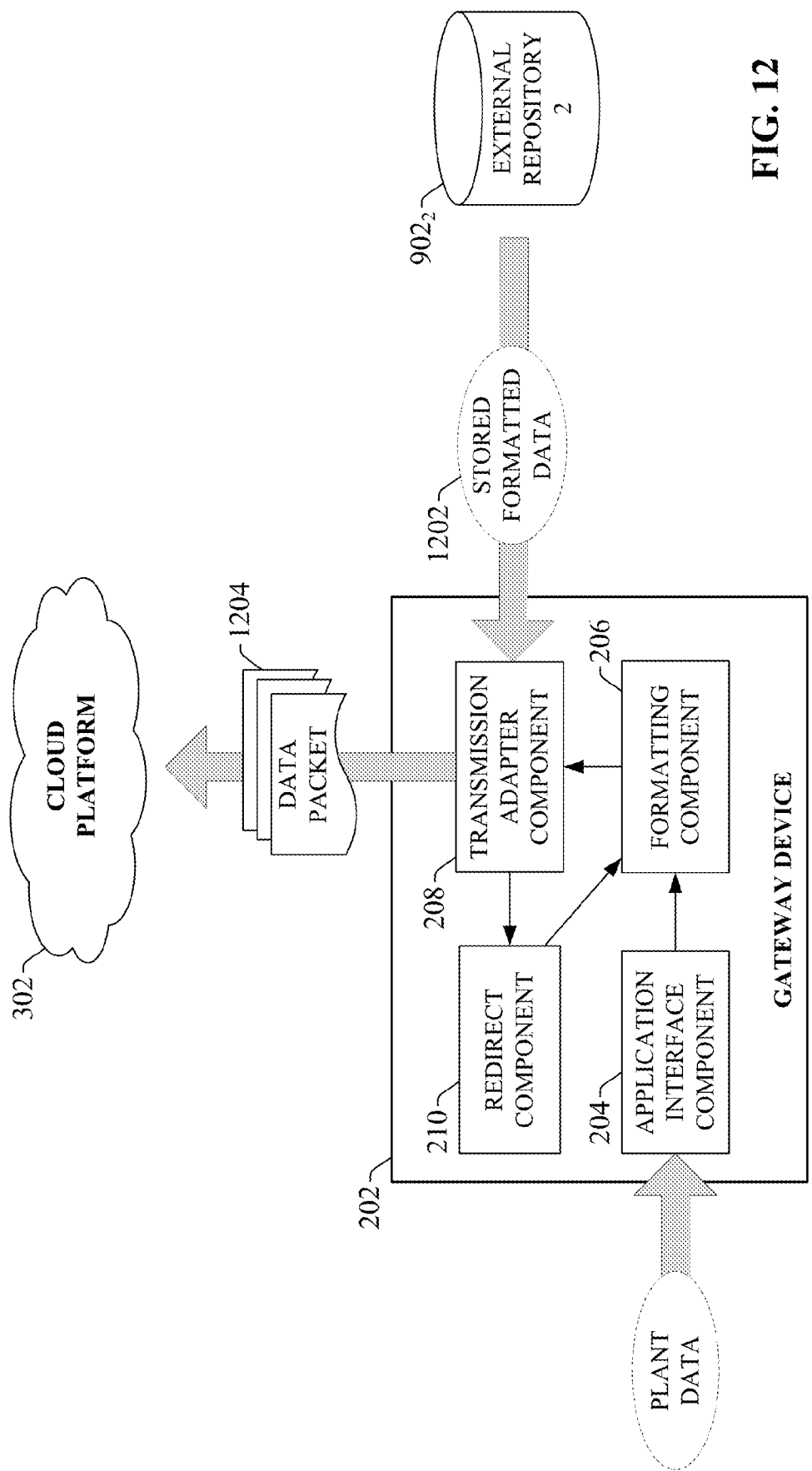
FIG. 12 is a diagram illustrating retrieval of previously redirected formatted data from an external repository by a cloud gateway device.

When the connection to the cloud platform is recovered, as illustrated in FIG. 12, redirect component 210 detects that the communication link between gateway device 202 and cloud platform 302 has been re-established and, in response, instructs formatting component 206 to resume passing the formatted plant data to the transmission adapter component 208 for encapsulation and transmission to the cloud platform 302 as data packets 1204. In addition, and in parallel with migration of new incoming plant data to the cloud platform, the redirect component 210 instructs gateway device 202 to begin retrieving the stored formatted data 1202 from repository $902_2$.

Figure 13:
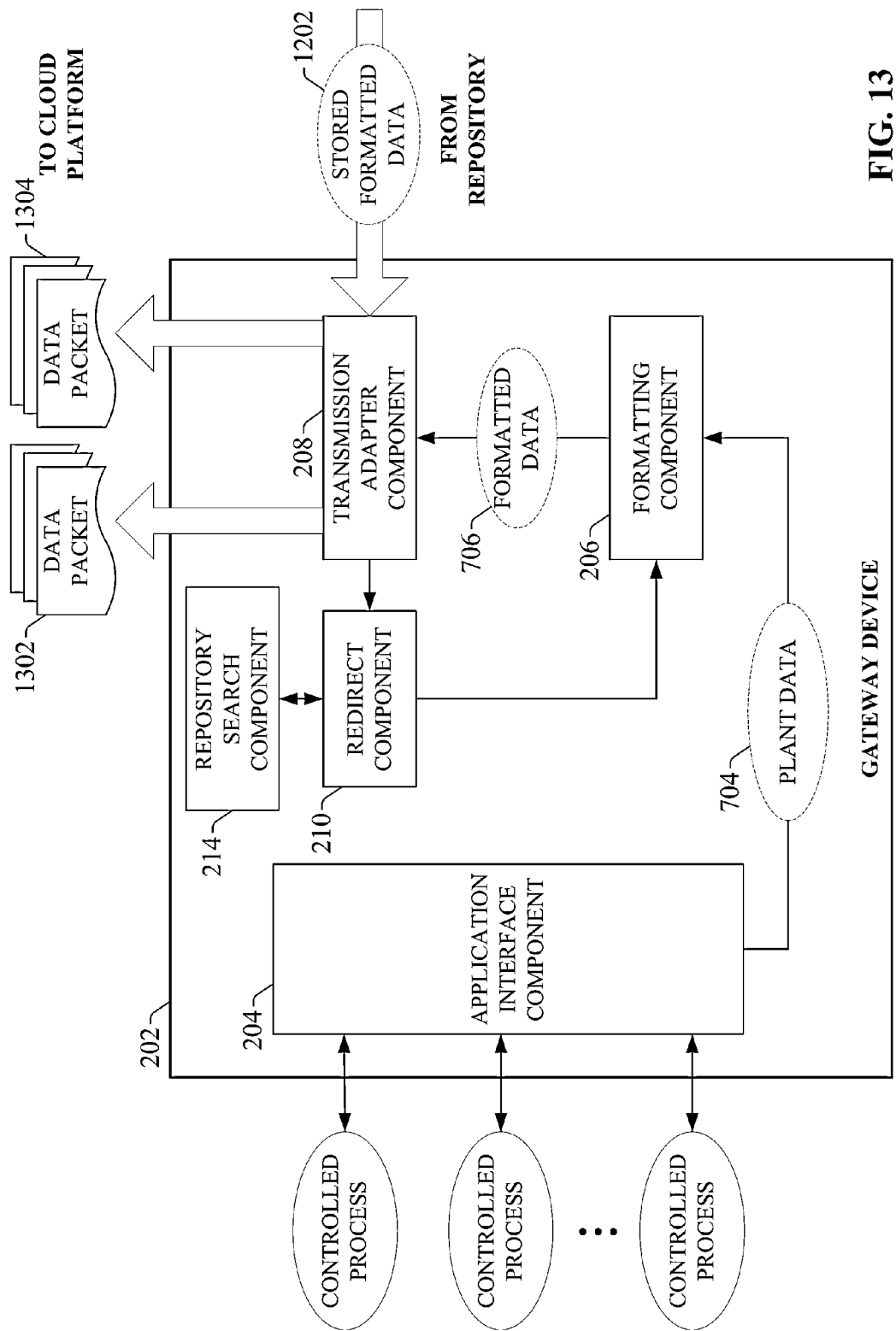
FIG. 13 is a diagram illustrating parallel collection and transmission of new plant data and previously redirected data by a cloud gateway device.

FIG. 13 is a diagram illustrating operation of the gateway device after reconnection to the cloud platform and before all the previously redirected data has been retrieved and sent to the cloud platform. In some embodiments, the transmission adapter component 208 can support parallel transmission of both new data packets 1302 and data packets 1304 containing the stored formatted data 1202 retrieved from the external repository. When the cloud gateway device reconnects to the cloud platform, collection of plant data 704 by the application interface component 204 continues uninterrupted, while the gateway device 202 simultaneously retrieves the stored formatted data 1202 from the external repository. Transmission adapter component 208 can perform parallel processing on the new formatted data 706 outputted by formatting component 206 and the stored formatted data retrieved from storage, so that the data that had been redirected during the communication loss can be more quickly provided to the cloud services without causing delays in transmission of the newly received plant data. That is, transmission adapter component 208 can continue encapsulating formatted data 706 into data packets 1302 for transmission to the cloud platform, while simultaneously encapsulating the stored formatted data 1202 into a second set of data packets 1304 as the previously redirected data is retrieved from external storage. Gateway device 202 continues this parallel processing and transmission until all previously redirected data has been retrieved from external storage and sent to the cloud platform.

All data processed by gateway device 202 is timestamped, either by the formatting component 206 or by the transmission adapter component 208. As such, the data provided to the cloud platform by the gateway device will be organized chronologically and processed appropriately by the cloud storage and analytics services even if some data—e.g., the redirected data retrieved from external storage—is sent to the cloud platform later then more recently collected data.

Figure 14:
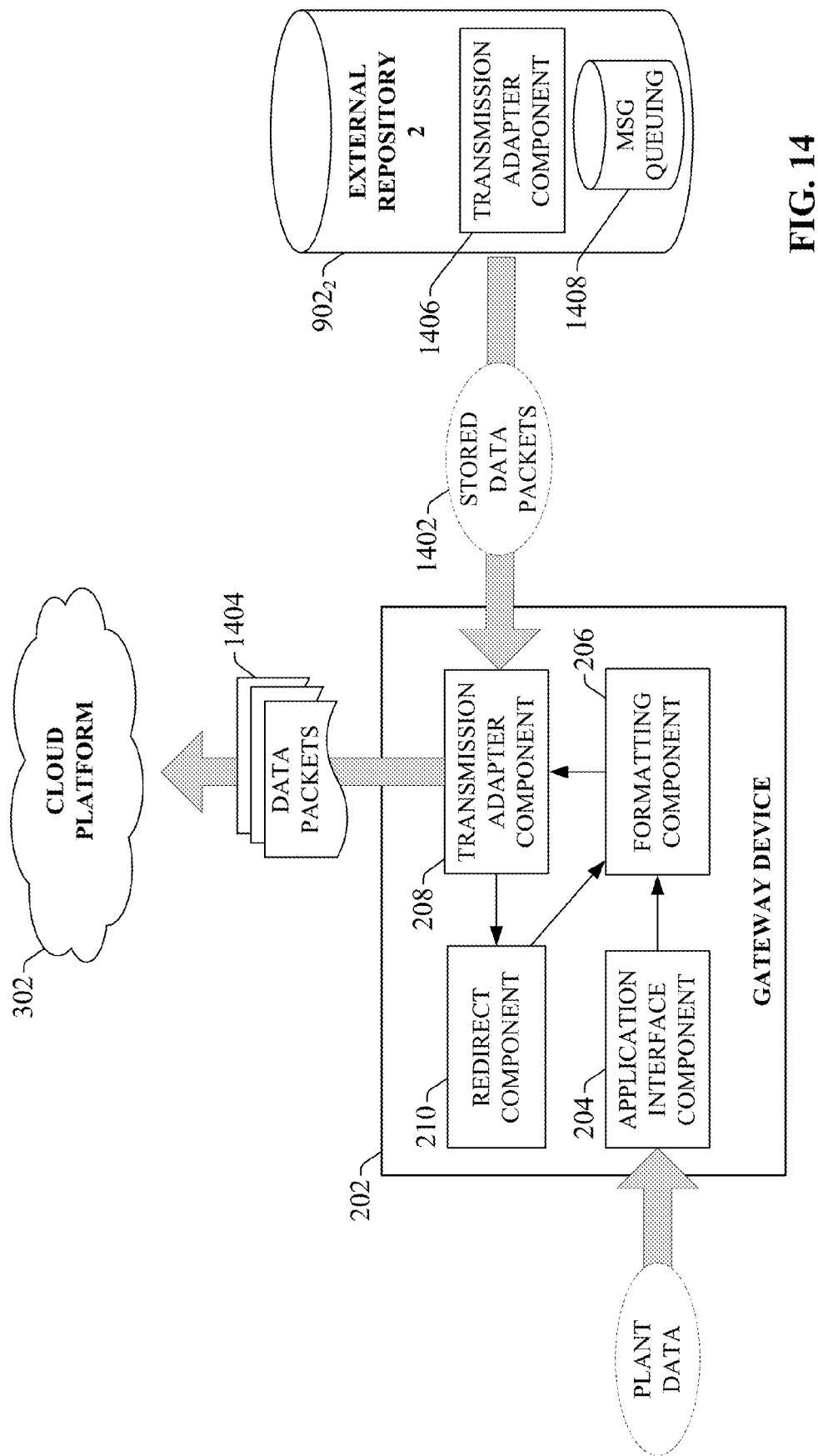
FIG. 14 is a diagram illustrating retrieval and transmission of stored data packets from an external repository by a cloud gateway device.

In some embodiments, the external repository can include its own transmission adapter component, which allows the external repository to perform at least a portion of the necessary pre-processing on the stored formatted data prior to retrieval by the gateway device. FIG. 14 is a diagram illustrating a configuration in which external repository $902_2$ includes a transmission adapter component 1406. As in the scenario described above in connection with FIGS. 7-11, a loss of communication to the cloud platform 302 has resulted in some formatted data being sent to the external repository $902_2$ for temporary storage. However, rather than merely store the formatted data for subsequent retrieval by the gateway device 202, a second transmission adapter component 1406 executing on external repository $902_2$ can compress and encapsulate the formatted data into data packets (e.g., data packet 324 of FIG. 5) while waiting for the communication link between gateway device 202 and cloud platform 302 to re-establish. Accordingly, when the communication channel to the cloud platform 302 is restored, the gateway device 202 retrieves the fully encapsulated stored data packets 1402 from the external repository 902, rather than retrieving pre-encapsulated formatted data. To ensure that the formatted data sent to the external repository $902_2$ is encapsulated with the correct customer-specific and application-specific information, the message queuing database 402 (see FIG. 4) containing the information needed to properly encapsulate the data can be cloned from the gateway device 202 to the external repository $902_2$, and this cloned message queuing database 1408 can be accessed by the transmission adapter component 1406 to encapsulate the redirected data. In some embodiments, the cloned message queuing database 1408 can be cloned periodically from the gateway device 202 to all external repositories on the network. This periodic cloning operation can be initiated and coordinated by the registration server, which contains the network addresses for all repositories on the network. Alternatively, the message queuing database can be cloned to an external repository upon installation of the repository on the network, and subsequent changes to the message queuing database on the gateway device can be pushed to all external repositories on the network.

Using the configuration depicted in FIG. 14, the gateway device 202 can retrieve and pass re-directed data to the cloud platform 302 more quickly after the communication channel has been restored, since the transmission adapter component 208 does not need to compress and encapsulate the retrieved data. This configuration also reduces the processing overhead required of the gateway device 202 during the period in which the redirected data is being retrieved from the external repository and sent to the cloud platform 302.

Although examples described above have depicted the external repository as a storage-only device that receives data from the gateway device for temporary storage during a store-and-forward operation, and returns the data to the gateway device upon reconnection of the gateway device to the cloud platform (either in its original form or encapsulated using a cloned transmission adapter component), in some embodiments the external repository may comprise another cloud gateway device having surplus storage capacity. In such scenarios, a first cloud gateway device having surplus storage capacity can serve as an external data repository for a second cloud gateway device in the event that the communication channel between the second gateway device and the cloud platform is interrupted.

For example, when a first cloud gateway device having surplus storage capacity is installed on the network (e.g., network 614 of FIG. 6), the gateway device registers with the registration server 602 as both a gateway device and as an external repository. Accordingly, when the registration server 602 receives a request for an external repository from a second gateway device during a store-and-forward operation, the registration server may select the first gateway device as the most suitable repository to which the second gateway device should send its formatted data while communication with the cloud platform is down. With this configuration, if the first cloud gateway device has not lost its connection to the cloud platform while the second gateway device is in store-and-forward mode (e.g., the cloud communication issue is local to the second gateway device rather than a global communication issue affecting all gateway devices on the network), the first cloud gateway device may receive the formatted data from the second cloud gateway device, encapsulate the data on behalf of the second gateway device, and send the resulting data packets to the cloud platform using its own communication channel. Thus, the first gateway device sends both its locally collected data packets as well as those received from the second gateway device to the cloud platform in parallel. When communications between the cloud platform and the second gateway device are restored, the second gateway device will cease sending data to the first gateway device, and both gateway devices will resume normal operation.

If both gateway devices have lost communication to the cloud platform, the first gateway device—given its surplus storage capacity—will continue collecting its own local data, storing the data on its local storage for subsequent delivery to the cloud platform. At the same time, the first gateway device will receive and store the redirected data from the second gateway device. The first gateway device will continue to collect and store both sets of data until communication to the cloud platform is restored, upon which the first gateway device will encapsulate both sets of stored data into respective sets of data packets, and send the two sets of data packets to the cloud platform in parallel. Meanwhile, the second gateway device will resume normal operation by ceasing transmission of its formatted data to the first gateway device and resuming encapsulation and transmission of its collected data to the cloud platform.

By redirecting incoming plant data to an external data store during a store-and-forward procedure, the cloud gateway functionality can be implemented on lightweight computing devices with relatively small amounts of local storage memory. This redirection functionality also facilitates uninterrupted collection of plant data in the event of communication loss between the cloud gateway device and the cloud platform, ensuring that cloud based analytics and reporting services produce accurate results.

Figure 15:
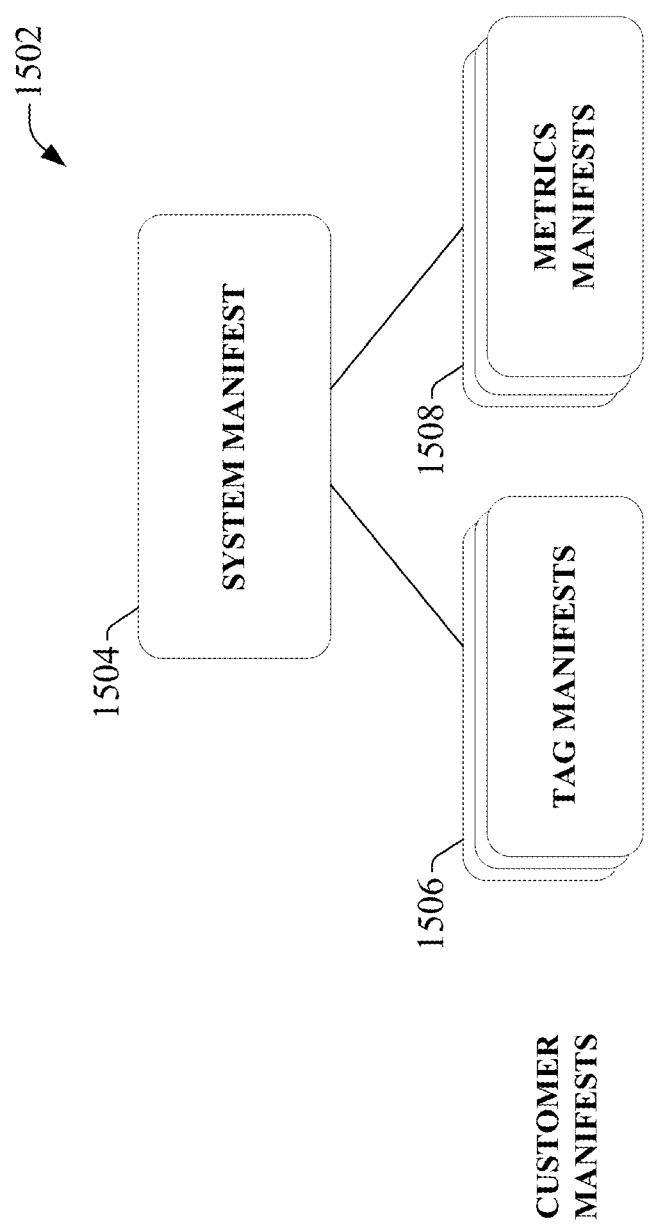
FIG. 15 is a conceptual diagram of an example manifest assembly.

Since the cloud gateway deice 202 encapsulates the on-premise plant data collected into envelopes containing customer-specific and application-specific information, the compressed data packets convey the parameters and data required by the cloud-based analytics services to identify the appropriate manifest stored in the customer's manifest assembly (e.g., manifest assembly 334) for handling, processing, and/or routing of the data contained in the compressed data file. FIG. 15 is a conceptual diagram of an example manifest assembly 1502. In this example, a system manifest 1504 maintained in manifest assembly 334 can include links to application-specific customer manifests. Customer manifests can comprise tag manifests 1506 and metrics manifest 1508. When a compressed data packet (e.g., compressed data packet 324, 708, 1204, 1302, or 1304) is received at the cloud platform from a cloud gateway device, data process service 308 uses information packaged in the header 502 of the packet to identify the appropriate metrics manifest and tag manifest for processing the data contained in the compressed data file 504. A worker role (e.g., worker role 332 of FIG. 3) loads the identified metrics and tag manifests, which are then executed on the received data. In general, the metrics manifest identifies one or more generic procedures that can be retrieved and executed on the data, as well as application-specific ranges, coefficients, and thresholds that may be passed to the retrieved procedures. The tag manifest identifies tag names used to map the data items in the compressed data file to variables or tags defined in the retrieved generic procedures.

Figure 16:
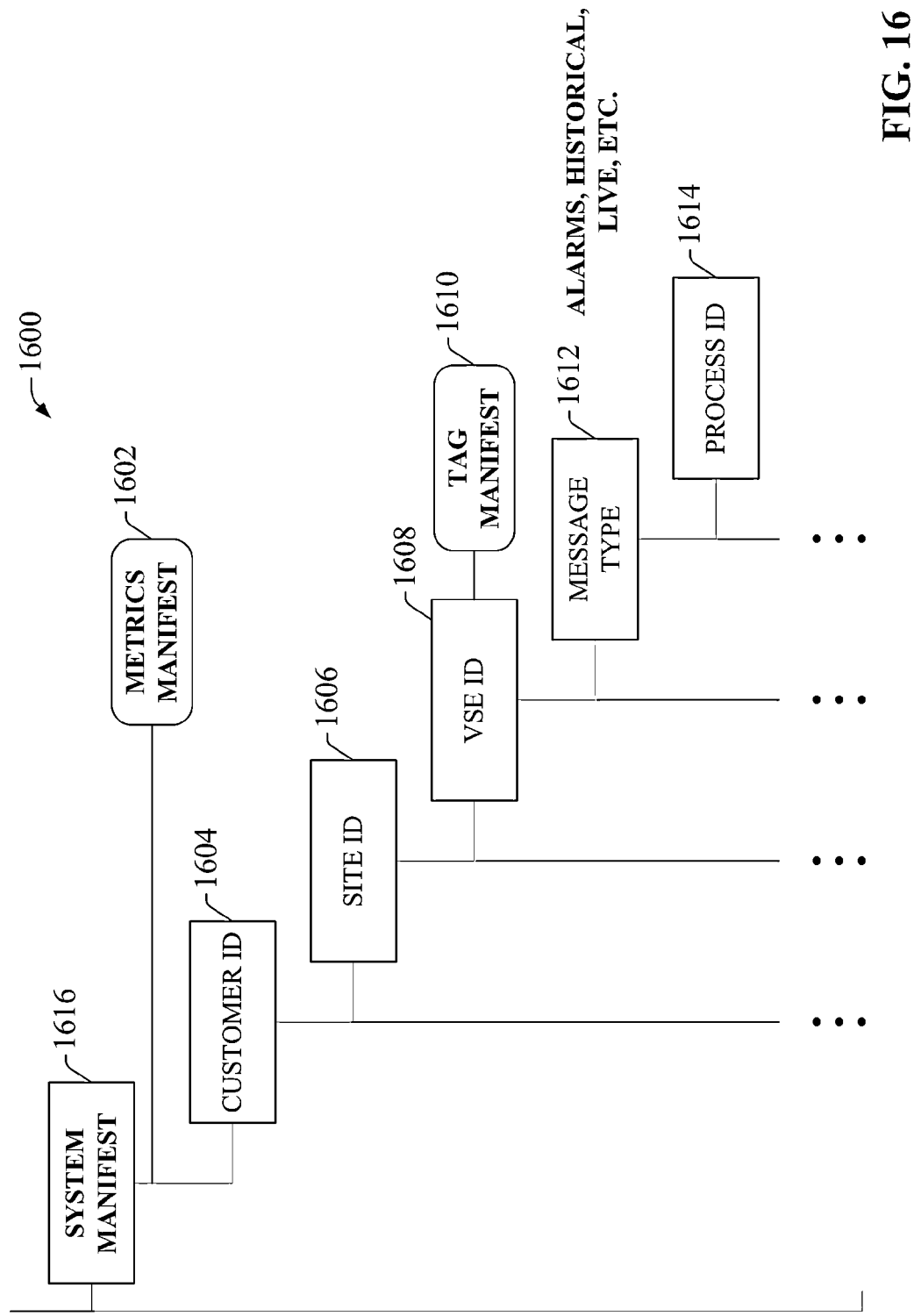
FIG. 16 is a diagram of an example hierarchical architecture for a system manifest.

FIG. 16 illustrates an example hierarchical architecture 1600 for the system manifest according to one or more embodiments. An example system manifest 1616 maintained on the cloud platform in manifest assembly 334 can be organized into multiple hierarchical levels. Each individual customer entity that will access the manifest assembly for processing of on-premise data can be defined under a customer identifier level 1604. Since each customer entity may operate multiple plant facilities or sites, one or more site identifier nodes are defined for each customer identifier node on a site identifier level 1606. For each defined site, one or more virtual support engineer (VSE) nodes are defined on a VSE identifier level 1608. A message type level 1612 and a process identifier level 1614 are defined under the VSE identifier level 1608.

The hierarchical levels that make up the logical architecture of the system manifest describes a hierarchical relationship between sets of on-premise industrial data collected from various data sources across an industrial enterprise. Note that the hierarchical levels of the example manifest depicted in FIG. 16 correspond to data fields included in header 502 of compressed data packet 324 (see FIG. 5). Thus, when an on-premise cloud gateway device sends a compressed data packet to the cloud platform, data process service 308 on the cloud platform leverages the information contained in the header to navigate the manifest's hierarchical architecture 1600 to identify the manifest assembly (metrics manifest and tag manifest) to be executed on the data contained in compressed data file 504.

In the example illustrated in FIG. 16, the metrics manifest 1602 is invoked when a compressed data packet is received by the cloud-based system. The metrics manifest 1602 defines one or more metrics (identified by the process identifier field of the compressed data packet header) that can be carried out on the data, and in particular defines the coefficients, thresholds, and ranges to be used for each identified metric. Each metric (process) corresponds to a generic procedure stored on the cloud platform in association with the manifest assembly 334.

To determine which metrics to apply to the received data, worker role 332 (see FIG. 3) uses the customer identifier, site identifier, and VSE identifier fields of header 502 to navigate the corresponding levels of the manifest hierarchy to identify the appropriate tag manifest 1610. The tag manifest 1610 identifies tag names used to map data items in the data file to the one or more metrics (processes) that will operate on the data. The tag manifest 1610 also identifies which process identifiers have ownership over each tag name. The particular process that will be executed on the data is identified by the message type and process identifier fields of the header 502. In this regard, the system manifest may define multiple message types (e.g., alarms, historical data, live data, etc.), and, for each defined message type, define one or more namespaces corresponding to a given process identifier. The namespaces identify corresponding applications stored in association with the manifest assembly that can be loaded by worker role 332 and executed on the data contained in the encapsulated data file. These applications may specify a final destination for the data (e.g., big data storage, one or more specified client devices, a visualization application, etc.), or may comprise algorithms or computational procedures to be carried out on the data to yield a desired result (e.g., a net power calculation, an efficiency calculation, a power guarantee calculation, etc.).

By this architecture, the worker role in the cloud platform will load the appropriate manifest assembly for processing a received data packet based on the customer from which the data was received, as well as other data attributes—such as the customer facility or site, the type of data (e.g., alarm data, historian data, live data from industrial devices, etc.), a specified process or metric, etc.—identified by the header of the compressed data packet. By encapsulating collected data on the plant floor to include these attributes prior to sending the data to the cloud, the cloud gateway device effectively applies a customer-specific model to the data that describes the data's context within the plant hierarchy, as well as the data's relationship to other data items across the enterprise. This information can then be leveraged on the cloud side to appropriately handle and process the data based on the data's role in the larger enterprise as well as user-defined processing and storage preferences.

Figure 17A:
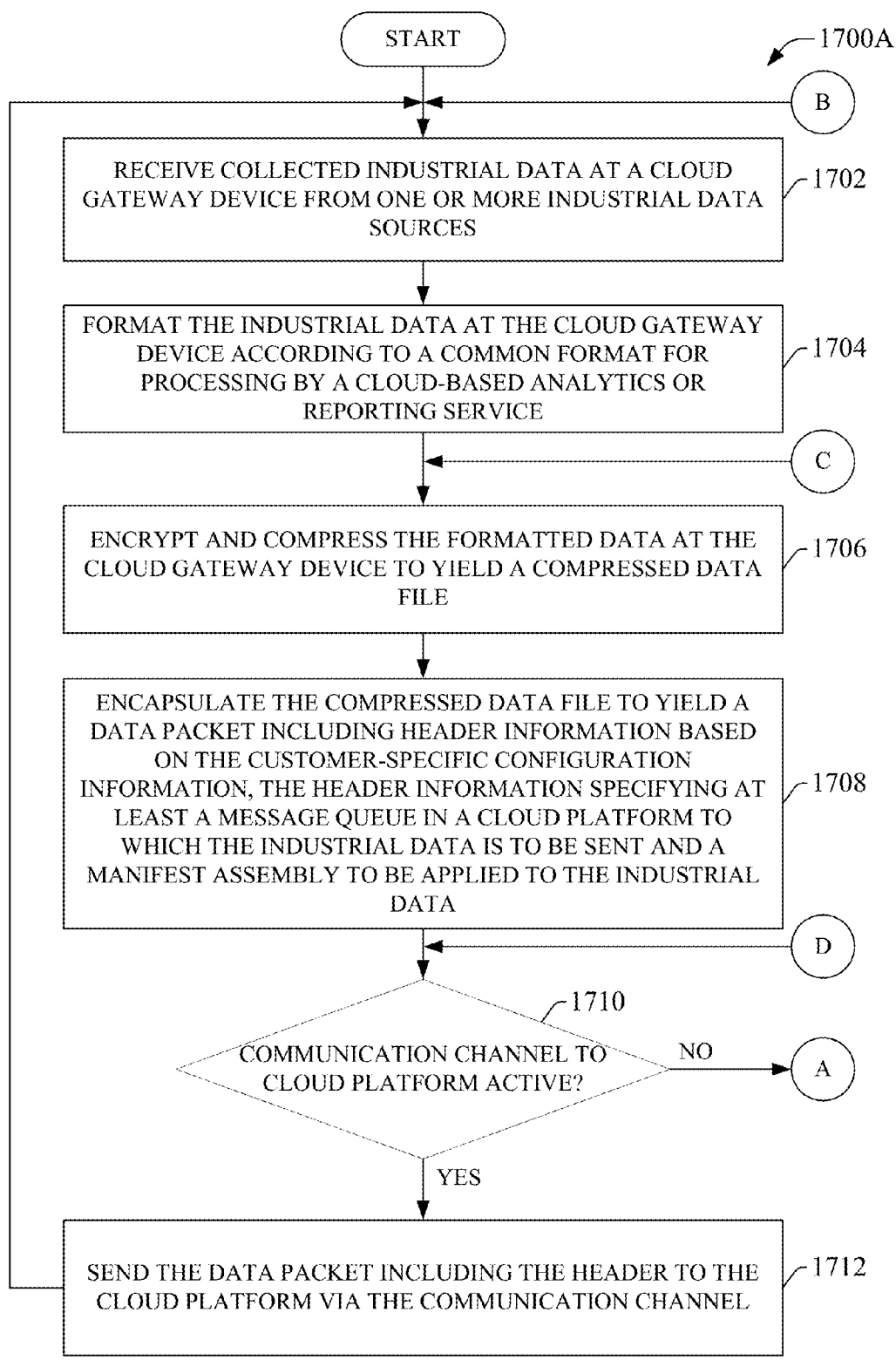
FIG. 17A is a first part of a flowchart of an example methodology for performing a store-and-forward operation on a cloud gateway device.
Figure 17B:
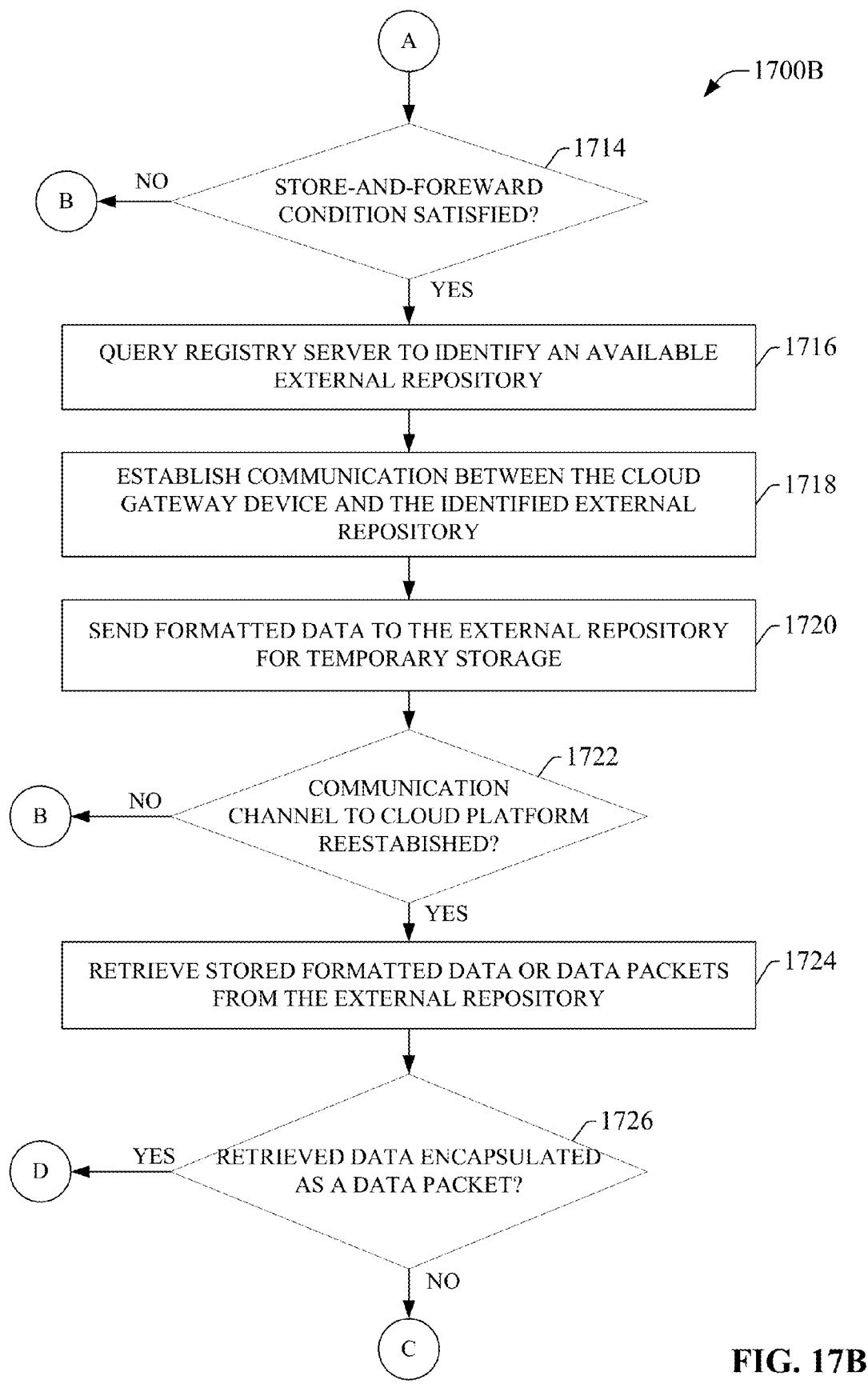
FIG. 17B is a second part of the flowchart of an example methodology for performing a store-and-forward operation on a cloud gateway device.
Figure 18:
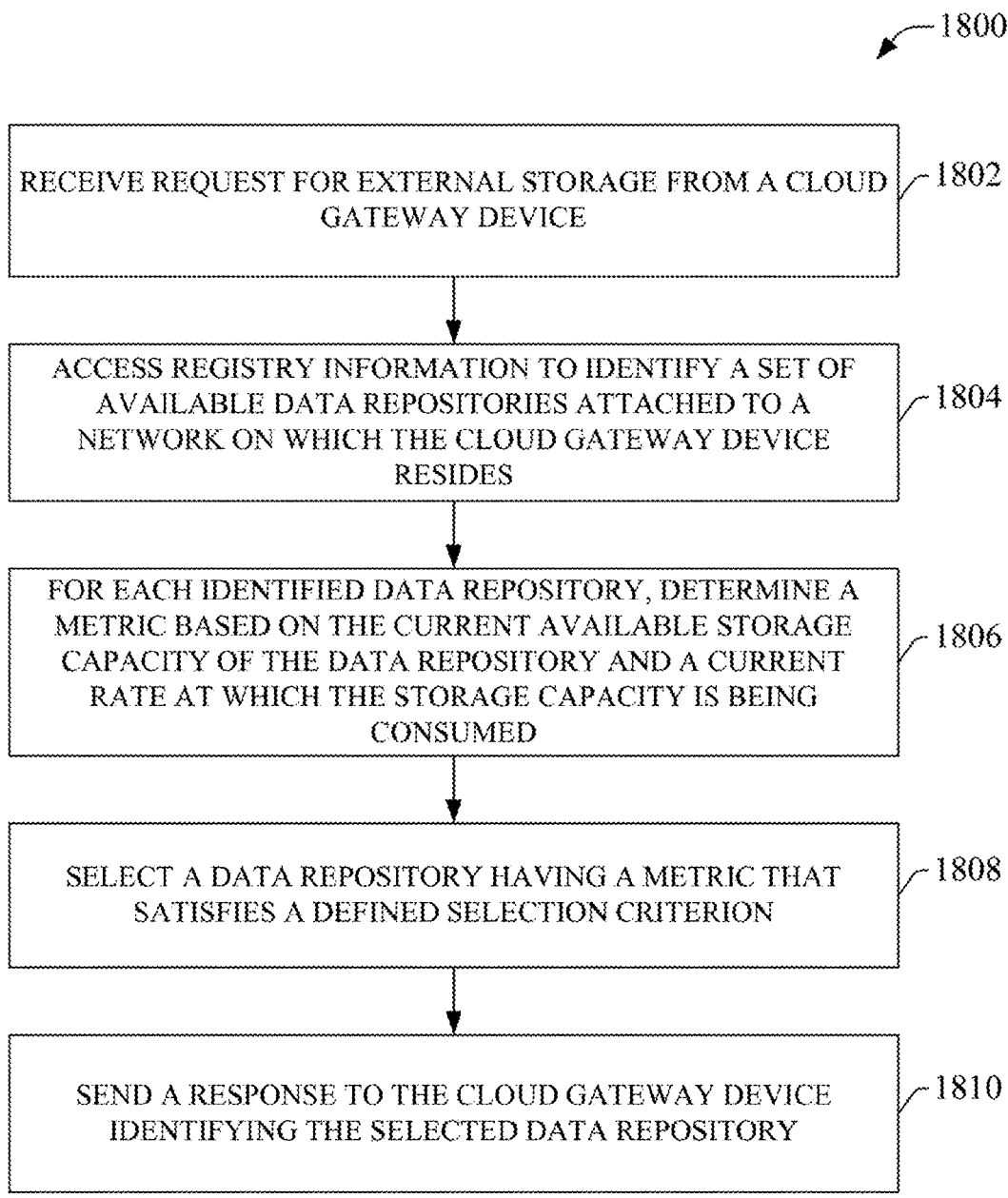
FIG. 18 is a flowchart of an example methodology for selecting an external repository for receipt of data from a cloud gateway device during a store- and forward operation.

FIGS. 17-18 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 17A is a first portion of an example methodology 1700A for performing a store-and-forward operation on a cloud gateway device. Initially, at 1702, collected industrial data is received at a cloud gateway device from one or more industrial data sources. These data sources can include substantially any industrial device or related data source, including but not limited to programmable logic controllers (e.g., data read from the controller's data table), telemetry devices, motor drives, industrial data historians, or other such devices. The cloud gateway device can receive the industrial data over a network connection (e.g., over a plant network or office network), or via a direct hardwired connection to the industrial devices.

At 1704, the industrial data received at step 1702 is formatted at the cloud gateway device to accord to a common format suitable for a cloud-based analytics or reporting service. For example, the cloud gateway device may transform the received data to a JSON data stream, which organizes the values into a human-readable name-value format. However, other data formats are also within the scope of one or more embodiments of this disclosure. At 1706, the formatted data is encrypted and compressed at the cloud gateway device to yield a compressed data file. At 1708, the compressed data file is encapsulated at the cloud gateway device to yield a data packet. The data packet includes header information based on customer-specific configuration information, and specifies at least a message queue in the cloud platform to which the industrial data is to be sent and a manifest assembly (e.g., analytics procedure) to be applied to the industrial data.

At 1710, a decision is made regarding whether the communication channel to the cloud platform is active. If the communication channel is active, the data packet produced at step 1708 is sent to the cloud platform via the communication channel. Alternatively, if the communication channel is not active, the methodology continues on FIG. 17B with the second portion of the methodology 1700B. At step 1714, a determination is made regarding whether a store-and-forward condition is satisfied. For example, the cloud gateway device may allow a limited amount of local storage to be used for store-and-forward purposes in the event of communication loss to the cloud platform. However, if a defined store-and-forward condition is met before the communication channel recovers, the cloud gateway device can initiate external store-and-forward operation. This defined store-and-forward condition may specify, for example, that external storage is to be used for store-and-forward functionality when a specified percentage of the cloud gateway device's local storage has been consumed. This prevents the cloud gateway device from prematurely redirecting data to external storage if the communication loss is brief, effectively "de-bouncing" the redirection operation.

If it is determined at step 1714 that the store-and-forward condition has not been satisfied, the methodology returns to step 1702, where the industrial data continues to be collected by the cloud gateway device and steps 1702-1710 are repeated. Alternatively, if the store-and-forward condition is satisfied, the methodology moves to step 1716, where the cloud gateway device queries a registry server to identify an available external data repository (data storage device). For example, the registration server may, in response to receipt of the query from the cloud gateway device, access device registration information that identifies each external repository attached to the network. If multiple repositories are available on the network, the registration server may apply a selection criterion to select one of the repositories for receipt of the gateway device's redirected data.

At 1718, communication is established between the cloud gateway device and the selected external repository identified at step 1716. At 1720, the formatted, encrypted, and compressed data generated at step 1706 is sent from the cloud gateway device to the selected external repository for temporary storage while the communication channel to the cloud platform is unavailable. At 1722, a determination is made regarding whether the communication channel to the cloud has been reestablished. If the communication channel has not been reestablished, the methodology returns to step 1702, and the industrial data continues to be collected, formatted, and sent to the external repository until the communication channel is determined to be reestablished at step 1722. When the communication channel is reestablished, the methodology moves to step 1724, where the formatted data stored in the external repository is retrieved by the cloud gateway device. Alternatively, if the external repository includes functionality for encapsulating the formatted data into data packets while waiting for the communication channel to reestablish, the cloud gateway device may retrieve these data packets rather than the previously redirected formatted data.

At 1726, a determination is made regarding whether the data retrieved from the external repository at step 1724 is a data packet (e.g., the external repository has converted the formatted data to encapsulated data packets). If the retrieved data is not a data packet, the methodology moves to step 1706, where the retrieved formatted data is encrypted and compressed, and steps 1708-1712 are performed to encapsulate the retrieved data and send the resulting data packet to the cloud platform. Alternatively, if the retrieved data is a data packet that has already been encapsulated at the external repository, the methodology moves to step 1710, where the communication channel to the cloud platform is once again verified, and the encapsulated data packet is sent to the cloud platform at step 1712. The methodology then returns to step 1702, and data collection and processing by the cloud gateway device continues.

FIG. 18 illustrates an example methodology 1800 for selecting an external repository for receipt of data from a cloud gateway device during a store- and forward operation. Initially, at 1802, a request is received from a cloud gateway device requesting external storage. The cloud gateway collects and processes industrial data from one or more industrial devices or processes, and sends this data to a cloud platform for storage, analytics, and/or reporting. The request may be sent by the cloud gateway device in response to loss of a communication channel to the cloud platform. The request may be received, for example, by a registration server that resides on a shared network with the gateway device. At 1804, registry information maintained on the registration server is accessed to identify a set of available data repositories attached to a network on which the cloud gateway device resides. This registry information can include information that identifies each data repository, as well as additional status information for each repository, including but not limited to an availability status, and amount of available storage capacity, a rate at which storage capacity is currently being consumed, a number of data sources currently providing data to the repository, etc.

At 1806, for each identified data repository, a metric is determined based on the current available storage capacity of the repository and a current rate at which the storage capacity is being consumed. For example, the registration server may, for each available data repository, estimate how long the repository will be able to receive data from the cloud gateway device before all of the repository's available data storage capacity is consumed, based on the repository's current available capacity, the current rate at which the repository's capacity is being consumed by data received from other data sources, and the expected rate at which data will be received from the cloud gateway device (which may also be stored as part of the registry information).

At 1808, a data repository having a metric that satisfies a defined selection criterion is selected by the registration server. For example, the defined criterion may specify that the repository estimated to be able to receive data from the cloud gateway device for the longest duration (based on the factors indicated above) is to be selected. At 1810, a response is sent to the cloud gateway device identifying the selected data repository.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 19:
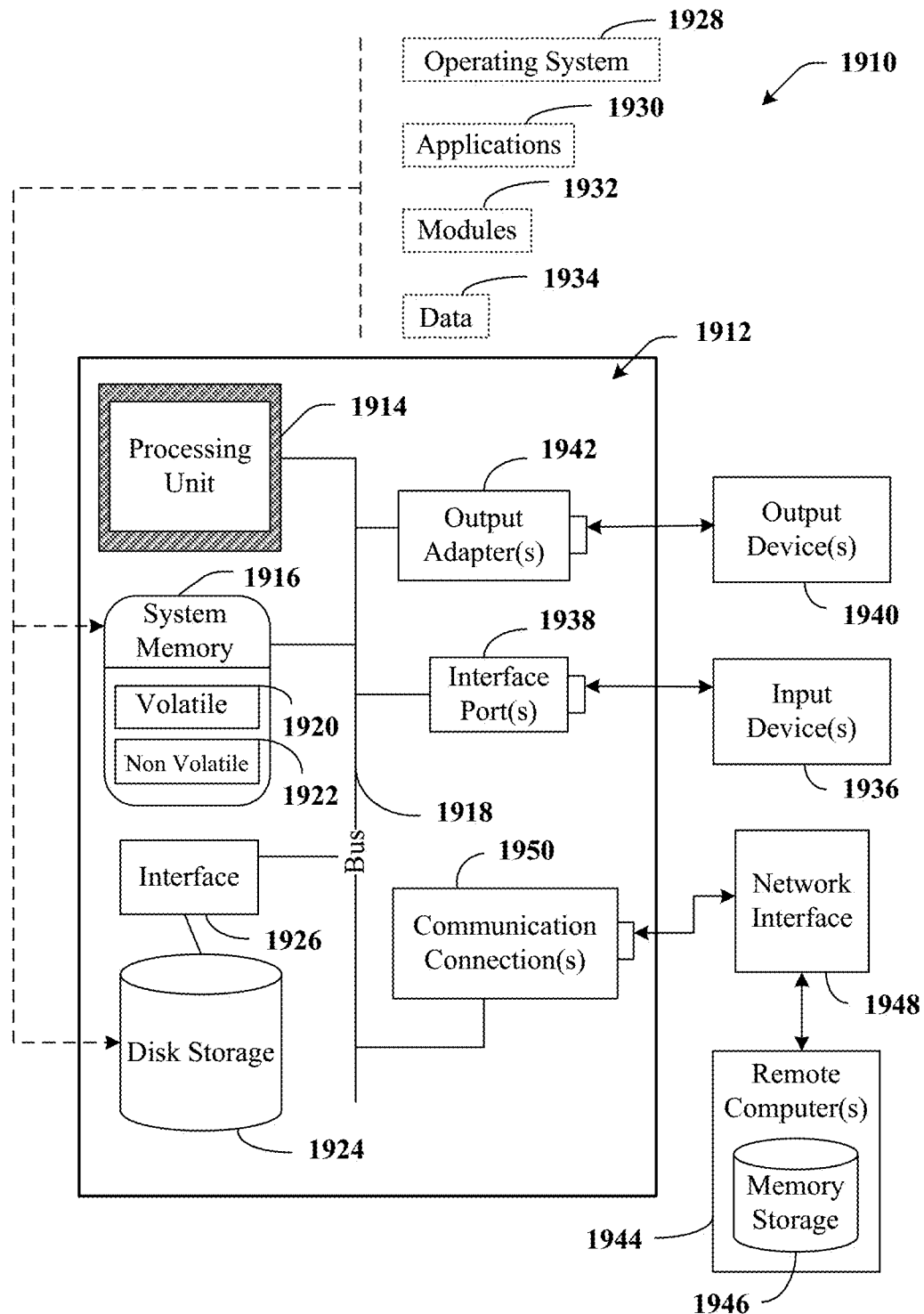
FIG. 19 is an example computing environment.
Figure 20:
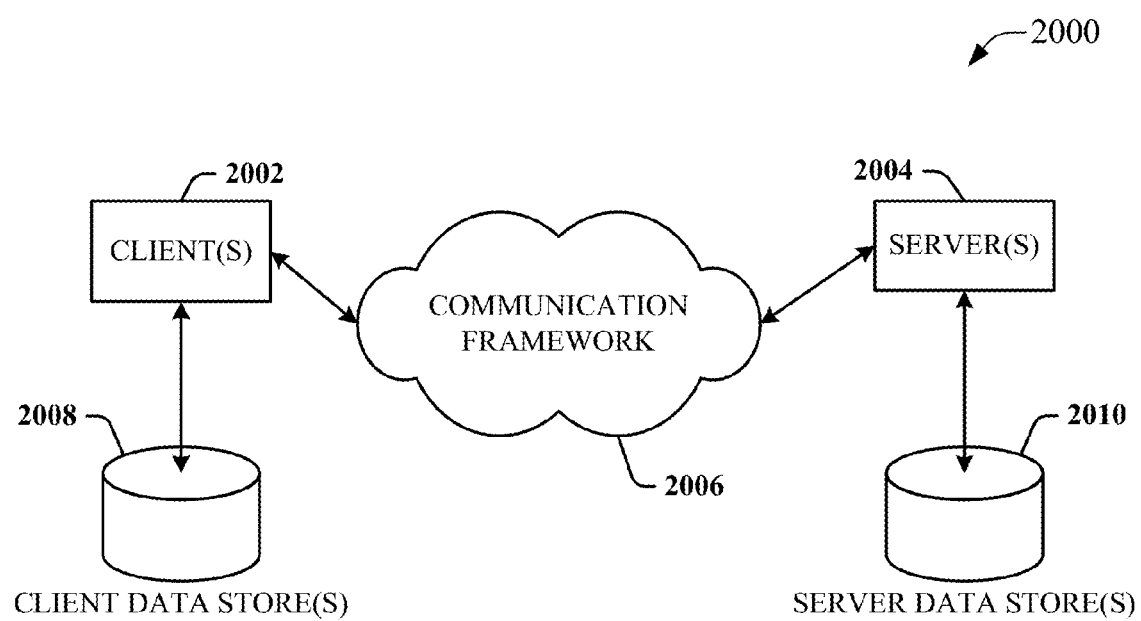
FIG. 20 is an example networking environment.

In order to provide a context for the various aspects of the disclosed subject matter, FIGS. 19 and 20 as well as the following discussion are intended to provide a brief, general description of a suitable environment in which the various aspects of the disclosed subject matter may be implemented.

With reference to FIG. 19, an example environment 1910 for implementing various aspects of the aforementioned subject matter includes a computer 1912. The computer 1912 includes a processing unit 1914, a system memory 1916, and a system bus 1918. The system bus 1918 couples system components including, but not limited to, the system memory 1916 to the processing unit 1914. The processing unit 1914 can be any of various available processors. Multi-core microprocessors and other multiprocessor architectures also can be employed as the processing unit 1914.

The system bus 1918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1916 includes volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can include read only memory (ROM), programmable ROM (PROM), electrically programmable ROM (EPROM), electrically erasable PROM (EEPROM), or flash memory. Volatile memory 1920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1912 also includes removable/non-removable, volatile/nonvolatile computer storage media. FIG. 19 illustrates, for example a disk storage 1924. Disk storage 1924 includes, but is not limited to, devices like a magnetic disk drive, floppy disk drive, tape drive, Jaz drive, Zip drive, LS-100 drive, flash memory card, or memory stick. In addition, disk storage 1924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface is typically used such as interface 1926.

It is to be appreciated that FIG. 19 describes software that acts as an intermediary between users and the basic computer resources described in suitable operating environment 1910. Such software includes an operating system 1928. Operating system 1928, which can be stored on disk storage 1924, acts to control and allocate resources of the computer 1912. System applications 1930 take advantage of the management of resources by operating system 1928 through program modules 1932 and program data 1934 stored either in system memory 1916 or on disk storage 1924. It is to be appreciated that one or more embodiments of the subject disclosure can be implemented with various operating systems or combinations of operating systems.

A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port may be used to provide input to computer 1912, and to output information from computer 1912 to an output device 1940. Output adapters 1942 are provided to illustrate that there are some output devices 1940 like monitors, speakers, and printers, among other output devices 1940, which require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a personal computer, a server, a router, a network PC, a workstation, a microprocessor based appliance, a peer device or other common network node and the like, and typically includes many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1950 refers to the hardware/software employed to connect the network interface 1948 to the system bus 1918. While communication connection 1950 is shown for illustrative clarity inside computer 1912, it can also be external to computer 1912. The hardware/software necessary for connection to the network interface 1948 includes, for exemplary purposes only, internal and external technologies such as, modems including regular telephone grade modems, cable modems and DSL modems, ISDN adapters, and Ethernet cards.

FIG. 20 is a schematic block diagram of a sample computing environment 2000 with which the disclosed subject matter can interact. The sample computing environment 2000 includes one or more client(s) 2002. The client(s) 2002 can be hardware and/or software (e.g., threads, processes, computing devices). The sample computing environment 2000 also includes one or more server(s) 2004. The server(s) 2004 can also be hardware and/or software (e.g., threads, processes, computing devices). The servers 2004 can house threads to perform transformations by employing one or more embodiments as described herein, for example. One possible communication between a client 2002 and servers 2004 can be in the form of a data packet adapted to be transmitted between two or more computer processes. The sample computing environment 2000 includes a communication framework 2006 that can be employed to facilitate communications between the client(s) 2002 and the server(s) 2004. The client(s) 2002 are operably connected to one or more client data store(s) 2008 that can be employed to store information local to the client(s) 2002. Similarly, the server(s) 2004 are operably connected to one or more server data store(s) 2010 that can be employed to store information local to the servers 2004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A cloud gateway device, comprising:
a memory that stores executable components;
a processor, operatively coupled to the memory, that executes the executable components, the executable components comprising:
an application interface component configured to receive industrial data from an industrial controller;
a formatting component configured to convert the industrial data to a common format to yield formatted data;
a transmission adapter component configured to encapsulate the formatted data with header information to yield a data packet and to send the data packet to a cloud platform over a communication channel;
a registration component configured to send gateway registration information for the cloud gateway device to a registration server device, wherein the gateway registration information comprises at least identification information for the cloud gateway device and an indication of a number of industrial data points being collected by the cloud gateway device, and the registration server device stores identity information and status information for data repository devices connected to a same network as the cloud gateway device; and
a redirect component configured to, in response to a determination that the communication channel has become unavailable,
send a query to the registration server device requesting an identity of a data repository device of the data repository devices,
receive, from the registration server device, the identity of the data repository device selected by the registration server device based on the number of industrial data points and the status information for the data repository devices, and
send the formatted data to the data repository based on the identity of the data repository.

2. The cloud gateway device of claim 1, wherein the redirect component is configured to send the formatted data to the data repository device in response to the determination that the communication channel has become unavailable and a determination that a store-and-forward criterion has been satisfied.

3. The cloud gateway device of claim 2, wherein the determination that the store-and-forward criterion has been satisfied comprises a determination that a defined percentage of local storage capacity of the cloud gateway device has been consumed.

4. The cloud gateway device of claim 1, wherein the executable components further comprise a registration component configured to send identification information for the cloud gateway device to the registration server device.

5. The cloud gateway device of claim 1, wherein the redirect component is further configured to, in response to a determination that the communication channel has been reestablished, retrieve the formatted data from the data repository device and provide the formatted data retrieved from the data repository device to the transmission adapter component.

6. The cloud gateway device of claim 5, wherein the transmission adapter component is further configured to perform parallel processing of new formatted data received from the formatting component and the formatted data retrieved from the data repository device.

7. The cloud gateway device of claim 1, wherein the header information is based on message queuing information retrieved from a message queuing data store by the transmission adapter component, the message queuing information comprising at least processing priority information defining processing priorities for respective data tags collected by the application interface component.

8. The cloud gateway device of claim 7, wherein the header information comprises at least one of a customer identifier of an industrial enterprise associated with the industrial controller, a site identifier associated with a plant facility, a virtual service engineer identifier, priority information specifying a processing priority for the industrial data, a message type identifier indicating a type of the industrial data, or a process identifier indicating a type of processing to be performed on the industrial data.

9. The cloud gateway device of claim 1, wherein the data repository device comprises another cloud gateway device.

10. A method for processing industrial data for migration to a cloud platform, comprising:
- sending, by a cloud gateway device comprising a processor, gateway registration information to a registration server device, wherein the gateway registration information comprises at least identification information for the cloud gateway device and an indication of a number of industrial data points being collected by the cloud gateway device, and wherein the registration server device stores identity information and status information for data repository devices connected to a same network as the cloud gateway device;
- collecting, by the cloud gateway device, industrial data from an industrial control device associated with an industrial enterprise;
- converting, by the cloud gateway device, the industrial data to conform to a defined data format to yield formatted data;
- adding, by the cloud gateway device, header information to the formatted data to yield a data packet;
- sending, by the cloud gateway device, the data packet to a cloud platform device over a first communication link;
- in response to determining that the first communication link has been interrupted:
  - sending, by the cloud gateway device, a query to the registration server device requesting an identity of a data repository device of the data repository devices;
  - receiving, by the cloud gateway device, response data comprising the identity of the data repository device, wherein the data repository device is selected by the registration server device based on the number of industrial data points and the status information for the data repository devices;
  - establishing, by the cloud gateway device, a second communication link to the data repository device; and
  - redirecting, by the cloud gateway device, the formatted data to the data repository device over the second communication link.

11. The method of claim 10, further comprising establishing the second communication link based on information about the external data repository device contained in the response data.

12. The method of claim 10, further comprising performing the establishing and the redirecting further in response to determining that a defined percentage of local storage capacity of the cloud gateway device has been filled.

13. The method of claim 10, further comprising:
- in response to determining that the first communication link has become available:
  - retrieving the formatted data from the data repository device via the second communication link,
  - adding the header information to the formatted data retrieved from the data repository device to yield another data packet; and
  - sending the other data packet to the cloud platform device over the first communication link.

14. The method of claim 10, wherein the sending the other data packet comprises sending the other data packet to the cloud platform device in parallel with one or more new data packets containing industrial data collected more recently than the formatted data retrieved from the data repository device.

15. The method of claim 10, wherein the adding the header information comprises adding at least one of a customer identifier, a site identifier associated with a plant facility, a virtual service engineer identifier, priority information, a message type identifier indicating a type of the industrial data, or a process identifier indicating a type of processing to be performed on the industrial data.

16. A non-transitory computer-readable medium having stored thereon instructions that, in response to execution, cause a cloud gateway device comprising a processor to perform operations, the operations comprising:
- sending, to a registration server device, gateway registration information comprising at least identification information for the cloud gateway device and an indication of a number of industrial data points being collected by the cloud gateway device, wherein the registration server device stores identity information and status information for data repository devices accessible by the cloud gateway device;
- receiving industrial data from one or more industrial devices comprising an industrial process;
- formatting the industrial data to accord to a common data format to yield formatted data;
- encapsulating the formatted data with header information to yield a data packet;
- sending the data packet to a cloud platform over a first communication channel; and
- in response to determining that the first communication channel has faulted:
  - querying the registration server device for an identity of a data repository device of the data repository devices;
  - receiving, in response to the querying, the identity of the data repository from the registration server device, wherein the data repository is selected by the registration server device based on the number of industrial data points and the status information for the data repository devices;
  - instantiating a second communication channel to the data storage device based on the identity; and
  - sending the formatted data to the data storage device over the second communication channel.

17. The non-transitory computer-readable medium of claim 16, wherein the operations further comprise:
- in response to determining that the first communication channel has been restored:
  - collecting the formatted data from the data storage device;
  - encapsulating the formatted data retrieved from the data storage device with the header information to yield another data packet; and
  - sending the other data packet to the cloud platform over the first communication channel.

18. The non-transitory computer-readable medium of claim 16, wherein the header information comprises at least one of a customer identifier, a site identifier associated with an industrial facility, a virtual service engineer identifier, priority information indicating a processing priority for the industrial data, a message type identifier indicating a type of the industrial data, or a process identifier indicating a type of processing to be performed on the industrial data.

19. The cloud gateway device of claim 1, wherein the status information for the data repository devices comprises at least respective rates at which data is being collected by the data repository devices.

20. The method of claim 10, wherein the status information comprises at least respective rates at which data is being collected by the data repository devices.

* * * * *